United States Patent
Gallant et al.

(10) Patent No.: US 6,931,010 B2
(45) Date of Patent: Aug. 16, 2005

(54) INTELLIGENT NETWORK AND METHOD FOR PROVIDING VOICE TELEPHONY OVER ATM AND PRIVATE ADDRESS TRANSLATION

(75) Inventors: John K. Gallant, Plano, TX (US); Thomas Glenn Hall, Jr., Richardson, TX (US); Steven R. Donovan, Plano, TX (US)

(73) Assignee: MCI, Inc., Ashburn, VA (US)

( * ) Notice: Subject to any disclaimer, the term of this patent is extended or adjusted under 35 U.S.C. 154(b) by 833 days.

(21) Appl. No.: 09/768,077

(22) Filed: Jan. 22, 2001

(65) Prior Publication Data

US 2002/0009086 A1 Jan. 24, 2002

Related U.S. Application Data

(60) Provisional application No. 60/176,928, filed on Jan. 20, 2000.

(51) Int. Cl.[7] ............................................... H04L 12/28
(52) U.S. Cl. ..................... 370/395.2; 370/400; 370/522; 370/254
(58) Field of Search ........................... 370/395.2, 395.5, 370/395.61, 322, 328, 352, 338, 353, 356, 389, 392, 396, 398, 399, 401, 474, 465, 254, 400, 522; 379/88.17, 221.08; 711/206; 709/226, 249

(56) References Cited

U.S. PATENT DOCUMENTS

| | | |
|---|---|---|
| 5,473,679 A | 12/1995 | La Porta et al. |
| 5,485,578 A | 1/1996 | Sweazey |
| 5,539,884 A | 7/1996 | Robrock, II |
| 5,819,019 A | 10/1998 | Nelson |
| 5,825,780 A | 10/1998 | Christie |
| 5,889,782 A | 3/1999 | Dendi |
| 5,946,323 A | 8/1999 | Eakins et al. |
| 5,987,520 A | 11/1999 | Libby et al. |
| 5,991,892 A | 11/1999 | Honda |
| 5,996,001 A | 11/1999 | Quarles et al. |
| 6,009,099 A | 12/1999 | Lewis et al. |
| 6,026,091 A | 2/2000 | Christie et al. |
| 6,078,586 A * | 6/2000 | Dugan et al. ............. 370/395.2 |
| 6,081,524 A | 6/2000 | Chase et al. |
| 6,081,525 A * | 6/2000 | Christie et al. ............. 370/392 |
| 6,115,380 A | 9/2000 | Christie et al. |
| 6,134,673 A | 10/2000 | Chrabaszcz |
| 6,141,322 A | 10/2000 | Poretsky |
| 6,144,671 A | 11/2000 | Perinpanathan et al. |
| 6,151,324 A | 11/2000 | Belser et al. |
| 6,169,735 B1 | 1/2001 | Allen, Jr. et al. |
| 6,181,703 B1 | 1/2001 | Christie et al. |
| 6,185,219 B1 | 2/2001 | Christie |
| 6,185,288 B1 | 2/2001 | Wong |
| 6,195,332 B1 | 2/2001 | Tang |
| 6,195,714 B1 | 2/2001 | Li et al. |
| 6,252,952 B1 | 6/2001 | Kung et al. |
| 6,253,207 B1 | 6/2001 | Malek et al. |

(Continued)

*Primary Examiner*—Phirin Sam
*Assistant Examiner*—Anthony T Ton

(57) ABSTRACT

An illustrative intelligent network and method for providing voice telephony over Asynchronous Transfer Mode ("ATM") and private address translation are provided that can provide significant advantages. The method includes generating an input ATM setup message at the calling party CPE that includes a VToA designator and a called party phone number, extracting information from the input ATM setup message, analyzing the information, designating an ATM address of a called party CPE to be stored in the first parameter of an output ATM setup message, determining if private address translation is needed, designating the ATM address of the called party CPE to be stored in a first instance of the second parameter of the output ATM setup message, designating an ATM address of an egress ATM edge switch to be stored in the first parameter of the output ATM setup message, and generating an output ATM setup message.

22 Claims, 10 Drawing Sheets

U.S. PATENT DOCUMENTS

| | | | |
|---|---|---|---|
| 6,262,992 B1 * | 7/2001 | Nelson et al. | 370/426 |
| 6,314,103 B1 | 11/2001 | Medhat et al. | |
| 6,317,439 B1 * | 11/2001 | Cardona et al. | 370/503 |
| 6,324,179 B1 | 11/2001 | Doshi et al. | |
| 6,359,859 B1 * | 3/2002 | Brolin et al. | 370/218 |
| 6,363,411 B1 * | 3/2002 | Dugan et al. | 709/202 |
| 6,381,246 B1 | 4/2002 | Constantinof et al. | |
| 6,396,840 B1 | 5/2002 | Rose et al. | |
| 6,424,652 B1 | 7/2002 | Christie | |
| 6,430,195 B1 * | 8/2002 | Christie et al. | 370/465 |
| 6,463,062 B1 * | 10/2002 | Buyukkoc et al. | 370/395.1 |
| 6,483,837 B1 | 11/2002 | Howell et al. | |
| 6,490,273 B1 | 12/2002 | DeNap et al. | |
| 6,535,483 B1 | 3/2003 | Christie et al. | |
| 6,535,507 B1 | 3/2003 | Li et al. | |
| 6,563,816 B1 | 5/2003 | Nodoushani et al. | |
| 6,614,781 B1 | 9/2003 | Elliott et al. | |
| 6,643,258 B1 | 11/2003 | Ise et al. | |
| 6,671,271 B1 * | 12/2003 | Takemura et al. | 370/352 |
| 6,674,746 B1 | 1/2004 | Lamarque, III | |
| 6,704,327 B1 | 3/2004 | Gardner et al. | |
| 6,721,284 B1 | 4/2004 | Mottishaw et al. | |
| 6,731,627 B1 | 5/2004 | Gupta et al. | |
| 6,757,278 B1 | 6/2004 | Bi et al. | |
| 6,757,285 B1 | 6/2004 | Lakhani et al. | |
| 6,822,961 B1 | 11/2004 | Constantinof et al. | |
| 2002/0099854 A1 * | 7/2002 | Jorgensen | 709/249 |
| 2004/0081174 A1 | 4/2004 | Lakhani et al. | |
| 2004/0179531 A1 | 9/2004 | Bi et al. | |

* cited by examiner

INTELLIGENT NETWORK AND METHOD FOR PROVIDING VOICE TELEPHONY OVER ATM AND PRIVATE ADDRESS TRANSLATION

CROSS-REFERENCE TO RELATED APPLICATIONS

Pursuant to 35 U.S.C. 119(e), this application claims the benefit of U.S. Provisional Patent Application No. 60/176,928, entitled FAST MSCP, filed Jan. 20, 2000, that named John K. Gallant, Steven R. Donovan, Terry A. Caterisano, Robert H. Barnhouse, David E. McDysan, Saib Jarrar, Thomas Glenn Hall, Jr., and Terry Robb as inventors, and which is hereby incorporated by reference for all purposes.

This application is related to U.S. patent application Ser. No. 09/768,068, entitled Intelligent Network and Method for Providing Voice Telephony over ATM, and named John K. Gallant, Thomas Glenn Hall, Jr., and Robert H. Barnhouse as joint inventors; U.S. patent application Ser. No. 09/768,070, entitled Intelligent Network and Method for Providing Voice Telephony over ATM and Alias Addressing, and named John K. Gallant as inventor; U.S. patent application Ser. No. 09/767,476, entitled Intelligent Network and Method for Providing Voice Telephony over ATM and Closed User Groups, and named Thomas Glenn Hall, Jr. and Steven R. Donovan as joint inventors; U.S. patent application Ser. No. 09/768,069, entitled Intelligent Network and Method for Providing Voice Telephony over ATM and Point-to-Multipoint Connectivity, and named Thomas Glenn Hall, Jr. as inventor; and U.S. patent application Ser. No. 09/766,943, entitled Intelligent Policy Server System and Method for Bandwidth Control in an ATM Network, and named John K. Gallant, Thomas Glenn Hall, Jr. and Steven R. Donovan as joint inventors; all filed on Jan. 22, 2001, and all of which are hereby incorporated by reference for all purposes.

Further, this application discloses subject matter related to the subject matter disclosed in the following co-assigned United States Patent Applications, each of which is incorporated herein by reference: *Method and Apparatus for Providing Reliable Communications in an Intelligent Network,* filed Jan. 12, 2000, Ser. No.: 09/481,910, now U.S. Pat. No. 6,535,991, in the names of: John K. Gallant, Cathleen A. McMurry, Robert H. Barnhouse, Steven R. Donovan, and Terry A. Caterisano; *Method and Apparatus for Providing Real-Time Call Processing Services in an Intelligent Network,* filed Oct. 20, 1999, Ser. No.: 09/421,827, now U.S. Pat No. 6,393,481, in the names of: Ajay P. Deo, Henry Wang, Sami Syed, and Wendy Wong; *Intelligent Call Processing System for a Telecommunications Network (Next Generation Intelligent Network (NGIN)),* filed Oct. 19, 1999, Ser. No.: 09/420,666, now U.S. Pat. No. 6,363,411, in the names of: Ajay P. Deo, Alan Holmes, Andrew Dugan, Kenneth Fischer, Sami Syed, Terence A. Robb, and Wendy Wong; *Method and Apparatus for Supporting ATM Services in an Intelligent Network,* filed Oct. 19, 1999, Ser. No.: 09/420,657, in the names of: Andrew Dugan, David E. McDysan, and Sami Syed; and *Method and Apparatus for Managing Resources in an Intelligent Network,* filed Oct. 19, 1999, Ser. No.: 09/420,655, in the names of: Alan Holmes, Andrew Dugan, Kelvin Porter, and Terence A. Robb.

TECHNICAL FIELD OF THE INVENTION

This invention relates in general to the field of data networks, telecommunications and more particularly to an intelligent network and method for providing voice telephony over Asynchronous Transfer Mode ("ATM") and private address translation.

BACKGROUND OF THE INVENTION

The need for both voice telephony services as well as data services is common. Traditionally, this may only be achieved through the use of separate services. For example, dedicated voice telephony services and dedicated data services are provided over separate and distinct networks. This is a significant disadvantage because of the high expense of maintaining and paying for such separate and distinct services, not to mention the inconvenience and inefficiency introduced because voice and data services are not integrated.

Packet-switched telecommunications networks may be based on any of a variety of technologies and protocols such as, for example, Asynchronous Transfer Mode ("ATM"), MultiProtocol Label Switching ("MPLS"), Internet Protocol ("IP"), Frame Relay ("FR"), and X.25. Packet-switched telecommunications networks have data packets, cells, frames or blocks (hereinafter "packets" or "cells") that are either of fixed length or variable length. Although originally designed to transmit data, as opposed to voice or voice encoded data, packet-switched telecommunications networks may be used for voice communications. Some of the packet-switched technologies that may be used for voice communications include, without limitation, Voice Telephony over ATM ("VToA"), Voice over Frame-Relay ("VoFR"), Voice over Digital Subscriber Line ("VoDSL"), and voice over IP ("VoIP").

Focusing on VToA when compared to voice communications or voice telephony provided over traditional circuit-dedicated or circuit-switching telecommunications networks, the use of VToA, unfortunately, presents significant problems and disadvantages, especially in view of the fact that the needs of both data communications and voice communications must be met over the same network. For example, VToA does not provide advanced telephony services and features that are commonly found in traditional circuit-dedicated telecommunications networks. Similarly, advanced signaling, also commonly found in traditional circuit-dedicated telecommunications networks, is not available for VToA in the same manner that circuit-dedicated or circuit-switching telecommunications networks.

To setup and establish a Switched Virtual Circuit ("SVC") to support VToA or an ATM data transfer between a calling party and a called party, various signaling or ATM messages are used within the ATM network. This may be achieved using ATM setup and connect messages. Once ATM signaling has established a SVC, a data connection is defined and data, such as data for a computer file or for voice encoded data, may be communicated. Data may continue to be communicated until one end of the SVC issues a release message (or any similar message that causes a disconnection). At such time, the SVC is released and voice communications ceases. Examples of traditional ATM signaling used to setup and release point-to-point and point-to-multipoint SVCs for data or telephony applications is illustrated in the book entitled Hands-On ATM by David E. McDysan and Darren L. Spohn, which is incorporated herein for all purposes.

In a traditional telecommunications or voice network, signaling can be in-band or out-of-band. Signaling may be used to setup and establish voice circuits, to provide Intelligent Network ("IN") or Advanced Intelligent Network ("AIN") services and features, and to disconnect voice circuits. In an ATM network, where an SVC is established to support VToA, signaling is achieved through the use of ATM messages, such as those used to setup and disconnect SVCs. Unfortunately, such ATM signaling does not support IN or AIN to provide the advanced telephony services and features commonly found in traditional voice telecommunications networks. This significantly reduces the attractiveness of VToA as compared to traditional voice telecommunications networks or even some other data or packet networks capable of providing voice or telephony communications services.

More particularly, a serious problem and drawback of existing VToA is the difficulty or inability to institute advanced calling features on an ATM network-wide basis. Unfortunately, many customary and advanced voice telephony services, which are often available through traditional telecommunications networks designed to transport and support voice telephony, such as circuit-dedicated telecommunications networks, are not available or easily achieved or implemented with VToA. For example, the capability to block calls from one or more locations in a corporation to other locations or areas, such as a specified country or countries, is a valuable service or option that is available in traditional voice telecommunications networks. To implement such a service or feature in a traditional VToA would require that blocking information be provided in various systems and gateways and updated as needed. This is inefficient, cumbersome and expensive to carry out. As is illustrated, this type of a service is problematic to implement in traditional VToA networks and systems. Various other valuable telecommunications services and features, which may be available in traditional telecommunications networks, suffer from the same significant disadvantage illustrated above.

In addition to the significant limitations in ATM signaling to support advanced or intelligent network telephony, the administration and maintenance of VToA systems and processes is extremely burdensome and expensive. For example, numerous private and public phone numbers, which change frequently, have to be updated and maintained in various systems and gateways. As moves, adds, changes, and deletions occur, each VToA gateway must be updated with the relevant changes. This is a critical task that is onerous and expensive to perform and fraught with potential errors.

Yet another significant disadvantage of ATM networks stems from the fact that ATM specifications do not provide an agreed upon addressing allocation, like there is with Internet Protocol ("IP") addresses, that will ensure that no two ATM switches or ATM devices have the same ATM address. This creates addressing conflict problems that significantly limit the application of ATM networks widespread. For instance, if two companies set up two different private ATM networks with ATM addresses that conflict with the other's ATM addresses, it is difficult or impossible to interface such private networks with one another through a public ATM network. ATM address conflicts may arise between ATM switches of each private ATM network, or between ATM switches of the public ATM network and ATM switches of either of the private networks. As is apparent, this prevents reliable communications, including both ATM data transfers and VToA, from being achieved using such ATM networks.

SUMMARY OF THE INVENTION

From the foregoing it may be appreciated that a need has arisen for an intelligent network and method for providing VToA and private address translation that provides intelligent network signaling to support advanced telephony services and features for VToA, while solving the ATM address conflict problem and still allowing the benefits of integrating voice and data communications on the same ATM network. In accordance with the present invention, an intelligent network and method for providing VToA and private address translation are provided that substantially eliminate one or more of the disadvantages and problems outlined above.

According to one aspect of the present invention, a method for providing VToA and private address translation using an intelligent network and a switched virtual circuit over an ATM network is provided. The method includes receiving a request at a calling party CPE to make a VToA call that includes a called party phone number value, generating an input ATM setup message at the calling party CPE that includes a VToA designator stored in a first parameter of the input ATM setup message, and the called party phone number value stored in a second parameter of the input ATM setup message, receiving the input ATM setup message at a device side of an ingress ATM edge switch of the ATM network, intercepting the input ATM setup message from the device side of the ingress ATM edge switch of the ATM network, and extracting information from the input ATM setup message that includes the VToA designator and the called party phone number value.

The method also includes analyzing the information to determine if the VToA designator is present, designating an ATM address of a called party CPE to be stored in the first parameter of an output ATM setup message, determining if private address translation is needed, designating the ATM address of the called party CPE to be stored in a first instance of the second parameter of the output ATM setup message, designating an ATM address of an egress ATM edge switch to be stored in the first parameter of the output ATM setup message, and generating an output ATM setup message that includes the ATM address of the egress ATM edge switch stored in the first parameter, the ATM address of the called party CPE stored in the first instance of the second parameter, and the called party phone number value stored in a second instance of the second parameter.

The method further includes communicating the output ATM setup message to a network side of the ingress ATM edge switch of the ATM network, receiving the output ATM setup message at a network side of the egress ATM edge switch, intercepting the output ATM setup message from the network side of the egress ATM edge switch of the ATM network, extracting egress information from the output ATM setup message that includes the ATM address of the called party CPE, designating the ATM address of the called party CPE that was stored in the first instance of the second parameter of the output ATM setup message to be stored in the first parameter of a destination ATM setup message, and generating a destination ATM setup message that includes the ATM address of the called party CPE stored in the first parameter and the called party phone number value stored in the second parameter.

Finally, the method includes communicating the destination ATM setup message to a device side of the egress ATM edge switch, and communicating the destination ATM setup message to the called party CPE.

The present invention provides a profusion of technical advantages that include the capability to efficiently and effectively provide advanced telephony services and functions to VToA through an intelligent network, including the capability to provide private address translation to eliminate possible ATM addressing conflicts. This can substantially increase overall VToA reliability, performance and can make VToA much more attractive to customers looking to seamlessly and efficiently integrate both data and voice over the same ATM network to achieve substantial savings, but still retain advance telephony capabilities.

Another technical advantage of the present invention includes the capability to utilize an ATM network to provide advanced telephony functions, while efficiently using ATM bandwidth by setting up SVCs to handle phone calls and releasing this bandwidth when the phone call has ended. This results in efficient utilization of ATM bandwidth and may save capital costs by reducing the amount of bandwidth needed.

Yet another technical advantage of the present invention includes the capability to control ATM telephony or voice routing tables in a central location and in the intelligent network layer, as opposed to the prior technique, defined by the various ATM standards bodies, to control ATM telephony at the end points. This significantly reduces overall costs to operate a telecommunications network to support VToA, and significantly reduces the opportunity for erroneous information entering the network. This advantage is achieved by separating the ATM intelligence from the ATM switching.

Still yet another technical advantage includes the capability to perform private address translation on both ATM data connections and VToA connections, while not requiring a customer or user with a private ATM network to change or reallocate internal ATM addresses.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
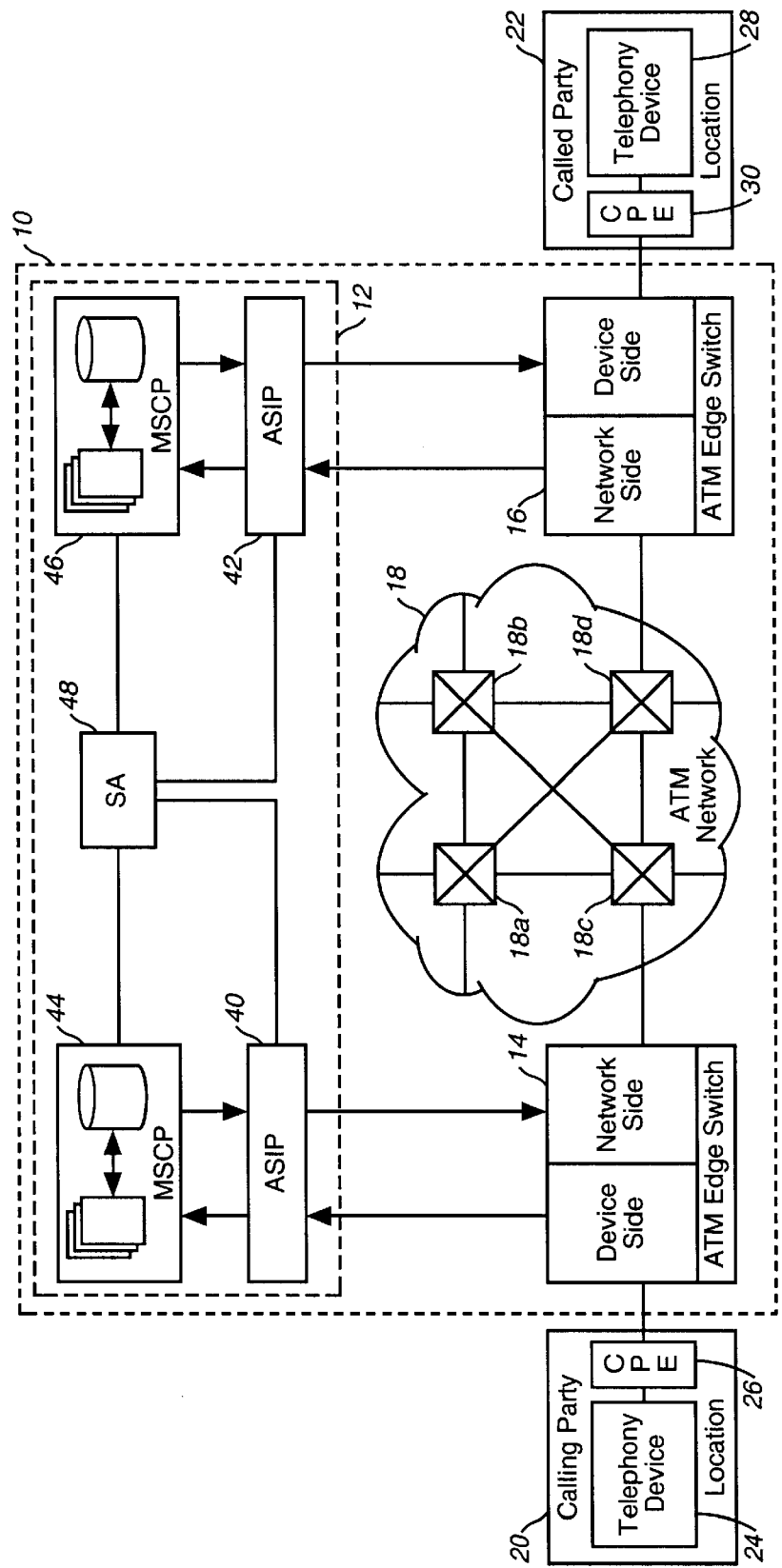
FIG. 1 is a diagram that illustrates a telecommunications network for providing VToA services, such as private address translation, using an ATM switched virtual circuit according to an embodiment of the present invention.

FIG. 1 is a diagram that illustrates a telecommunications network 10, which also may be referred to as an intelligent ATM network or as a Smart Bandwidth on Command ("SBoC") network, for providing Voice Telephony over ATM ("VToA") services, such as private address translation, using an ATM Switched Virtual Circuit ("SVC") according to an embodiment of the present invention. The description below in connection with FIGS. 1–4 provides a discussion of the operation of the telecommunications network 10 so that the private address translation aspect of the present invention may be described more fully in connection with the description accompanying the FIGS. 5, 6, 7, 8a, 8b, 9a, and 9b.

The telecommunications network 10 includes an intelligent network 12, which also may be referred to as an intelligent network layer, in communication with an ATM edge switch 14 and an ATM edge switch 16 of an ATM network 18. A calling party location 20 is illustrated in communication with the ATM edge switch 14, and a called party location 22 is shown in communication with the ATM edge switch 16.

The intelligent network 12 is operable to intercept and process ATM signaling messages provided to the ATM edge switch 14 and the ATM edge switch 16. This architecture allows the intelligent network 12 to provide various telephony features and services, including advanced telephony features and services, to VToA provided over an ATM network, such as the ATM network 18, through a SVC.

It should be noted that the ATM edge switch 14 and the ATM edge switch 16 may be considered to be part of the ATM network 18. Of course, the ATM network 18 may include any of a variety of ATM switches and/or ATM network elements or devices and may geographically span or cover virtually any region. The ATM switches of the ATM network 18, including the ATM edge switch 14 and the ATM edge switch 16, may be provided by any of a number of ATM switch manufacturers, such as, for example, NEWBRIDGE and ALCATEL. Of course, multiple connections can be provided to the ATM network 18 through any of a variety of edge switches, such as at the ATM edge switch 14. In order to simplify the illustration of the present invention, including the illustration of setting up a VToA call originating from a calling party, only two connections to the ATM network 18 are illustrated in FIG. 1 and include the calling party location 20 and the called party location 22.

The calling party location 20 and the called party location 22 may include any of a variety of end-user devices and Customer Premises Equipment ("CPE"). For example, the calling party location 20, which could be referred to as an ingress location since this is the calling location, includes a telephony device 24 and a CPE 26. Similarly, the called party location 22 is illustrated with a telephony device 28 and a CPE 30.

Of course, any of a number of arrangements may be provided at the calling party location 20 and the called party location 22. In one embodiment, these locations may also include Data Communications Equipment ("DCE") to support traditional ATM data communications. As is apparent, the capability to communicate both data and voice over the same ATM network provides significant advantages and conveniences that normally result in substantial savings. This arrangement in combination with the present invention allows both VToA calls, with intelligent network features and services provided or controlled by the intelligent network 12, and ATM data transfers to be supported using the same ATM network, such as the ATM network 18. For example, a business enterprise that has multiple locations may significantly benefit by providing voice communications, with intelligent networking features, using VToA and data communications all through the same ATM network.

In one embodiment, the telephony device 24 and the telephony device 28 may be provided as a telephone, a personal computer, a computer network, answering machine, video conferencing equipment, or any of a variety of other devices operable to support or provide telephony functionality. The CPE 26 and the CPE 30 may be implemented using any of a number of devices. For example, and without limitation, the CPE 26 and the CPE 30 may be implemented as a router, a PBX with ATM signaling capability, an enterprise gateway, or a network gateway. The CPE 26 and the CPE 30 may be implemented, in one embodiment, using a CPE device provided by ACCELERATED NETWORKS.

The communications link between the ATM edge switch and the calling party or called party location may be provided using any number of available links, such as dedicated links or leased lines. According to an aspect of the present invention, whenever a customer location desires to set up or establish a SVC to support VToA, a signaling ATM message, such as an ATM setup message, is provided from the customer location to the associated ATM edge switch of the ATM network 18. For example, if the calling party location 20 desires to establish a SVC through the ATM network 18, an ATM setup message may be sent from the calling party location 20 to the ATM edge switch 14. This ATM setup message may be used to designate that this SVC is being setup or established to provide VToA. In one embodiment, an ATM setup message is sent from the calling party location 20 to the ATM edge switch 14 using a predefined or predetermined protocol such that a designated value, which may be referred to as a VToA designator, is included in the content or payload of the ATM setup message to indicate that this SVC is being set up or established to support VToA.

In one embodiment, the telephony device 24 is provided as a telephone or personal computer with telephony software, and the CPE 26 is provided as an enterprise gateway that is provisioned with a special ATM address to identify the CPE 26 as an ATM device. An ATM setup message may be generated by a calling party by using the telephony device 24 to enter a phone number, which may be referred to as a called party phone number value. The CPE 26 generates the ATM setup message, which may be referred to as an input ATM setup message, in response to initiate a SVC for VToA by saving various values in the content of the ATM setup message.

The content may be stored in an ATM setup message using various designated areas, which may be referred to as fields, addresses or parameters. The content that is stored in each such parameter may be referred to as a value. An example of some of the parameters that may be present in an ATM setup message is provided in the following table:

TABLE 1

| ATM SETUP MESSAGE PARAMETERS |
| --- |
| Called Party Number |
| Called Party Subaddress |
| Calling Party Number |
| Calling Party Subaddress |

In a preferred embodiment of the present invention, the ATM address of the CPE 26, which may be referred to as the ATM address of the calling party CPE, is stored in the ATM setup message as the calling party number parameter, the telephone number associated with the telephony device 24, which may be referred to as the calling party phone number value, is stored in the ATM setup message as the calling party subaddress parameter, a special or designated number or address, which may be referred to as the VToA designator, is stored in the called party number of the ATM setup message, and the dialed or called telephone number, which may be referred to as the called party phone number value, is stored in the called party subaddress of the ATM setup message.

This input ATM setup message is then provided to the ATM network 18 at the ATM edge switch 14. In essence, this ATM setup message instructs the ATM network 18 to setup a SVC between the ATM address of the CPE 26 and the special or designated ATM address that is provided as the called party number of the ATM setup message. This special or designated ATM address or number may also be referred to as a VToA designator. This is a predetermined or predefined number which will be used by the intelligent network 12 to indicate that this setup message request for a SVC is to provide VToA and hence the advance telephony services or features of the present invention should be applied by the intelligent network 12.

The input ATM setup message is received at the ATM edge switch 14. The ATM edge switch 14, just like the ATM edge switch 16, may be thought of as divided into two portions, a device side portion and a network side portion. The device side is the side where a customer or client interfaces, generally through a CPE, with the ATM network 18. Signaling messages received at the device side of the ATM switch 14 from the CPE 26 are intercepted by the intelligent network 12. The intelligent network 12, which will be described more fully below in connection with FIG. 1 and FIGS. 3 and 4, receives the input ATM setup message generated by the CPE 26 and analyzes its contents. From this analysis, the presence of the VToA designator, which in one embodiment may be stored in the called party number parameter of the ATM setup message, indicates that this input ATM setup message is a request to setup an SVC for VToA.

Once it is determined that the signaling message is a request to setup or establish a SVC for VToA, the intelligent network 12 will, preferably, perform as much processing as possible on the ATM setup message at the ingress ATM edge switch. Before discussing some of the various intelligent network services or features that may be provided by the present invention, the processing of the input ATM setup message is discussed. In one embodiment, the intelligent network 12 locates the called party phone number value and performs a table search or "look-up" to determine a corresponding ATM address, such as the ATM address for a destination CPE or device, such as a termination gateway, an enterprise gateway or a network gateway. This ATM address may be referred to as the ATM address of the called party CPE. In a preferred embodiment, the called party phone number value is retrieved from the called party subaddress parameter to perform the necessary functions to find the associated destination ATM address. Once located, this destination ATM address may be provided so that a modified or output ATM setup message may be generated to establish a SVC to support VToA from the CPE 26 to the destination ATM device. In a preferred embodiment, the calling party phone number value is stored in the calling party subaddress parameter of the input ATM setup message, and the ATM address of the calling party CPE or device is stored in the calling party number parameter of the input ATM setup message.

When a VToA call originates from the calling party location 20 and terminates at the called party location 22, the ATM edge switch 14 may be referred to as the ingress ATM switch while the ATM edge switch 16 may be referred to as the egress ATM edge switch. Generally, each such ATM edge switch may function as either an ingress or an egress ATM edge switch.

The output ATM setup message is transmitted from the intelligent network 12 to the network side of the ATM edge switch 14 where it is sent to the ATM network 18. The output ATM setup message is transmitted through the ATM network until it arrives at the network side of the ATM edge switch 16. The intelligent network 12 intercepts and processes this ATM message and, generally, will provide the ATM message back to the device side of the ATM edge switch 16 at the appropriate port so that it will be communicated to the CPE 30 of the called party location 22. If the intelligent network 12 modifies or changes the output ATM setup message, the resulting ATM message may be referred to as a destination or gateway ATM setup message.

A preferred embodiment of an implementation of the intelligent network 12 is provided next. The intelligent network 12, as shown in FIG. 1, includes an ATM signaling intercept processor ("ASIP") 40, which is associated with the ATM edge switch 14 that is shown serving as an ingress ATM edge switch, an ASIP 42, which is associated with the ATM edge switch 16 that is shown serving as an egress switch, a multi-service control point ("MSCP") 44 in communication with the ASIP 40, an MSCP 46 in communication with the ASIP 42, and a service administration 48. The service administration 48, in the embodiment shown in FIG. 1, is operable to provision the ASIP 40, the MSCP 44, the ASIP 42, and the MSCP 46. In provisioning these elements of the intelligent network 12, the service administration 48 will, preferably, provide user interfaces to each such element. In a preferred embodiment, the service administration 48 also maintains a database of record, which may be the same as or similar to the database shown in the MSCP 44 and the MSCP 46.

The ASIP 40 and the ASIP 42 will generally be associated with a designated ATM edge switch, such as the ATM edge switch 14 and the ATM edge switch 16. The MSCPs, such as the MSCP 44 and the MSCP 46, may interface or work in conjunction with one or more ASIPs. In an alternative embodiment, one MSCP interfaces and works with all ASIPs of the intelligent network 12. All of the MSCPs of the intelligent network 12 may provide the same or essentially the same functionality.

The ASIP 40 and the ASIP 42, generally, function to intercept ATM signaling messages, such as an ATM setup message, an ATM connect message, and an ATM release message. The ASIP 40 and the ASIP 42 intercept and process ATM signaling messages from the associated switch whether the signaling messages are provided from the device side or from the network side of the associated ATM edge switch. It should be noted that the ASIP 40 and the ASIP 42 are both capable of or operable to receive signaling messages provided through their associated ATM edge switch in either direction. For example, although the call setup illustrated in FIG. 1 illustrates a VToA call that originates at the calling party location 20 and terminates at the called party location 22, the ASIP 40 and the ASIP 42 perform their functions when the ATM signaling messages are traveling in the opposite direction, such as if the called party location 22 originates a VToA call through a SVC to the calling party location 20. Once the ATM signaling message, such as the input ATM setup message, is intercepted, an input is generated by the ASIP and the input is provided to the associated MSCP, such as the MSCP 44 and the MSCP 46.

The MSCP 44 and the MSCP 46 both contain various applications that can provide intelligent network and even advanced intelligent network VToA services and features. The applications will preferably be provided as software applications that provide the desired logic and algorithms to achieve the desired intelligent network service or feature. In performing these various services and features, the MSCPs must access various information that may include, for example, ATM addresses, associated telephone numbers, customer profiles, user profiles, and any of a variety of other needed information to support or provide the desired service and feature.

As a result of the processing performed by the MSCP 44 and the MSCP 46, an output is generated. The output is then provided back down, as represented by the arrows extending from the MSCPs to their associated ASIPs, so that the ASIP 40 and the ASIP 42 may assemble the output to generate a resulting ATM message. The ASIP, in a preferred embodiment, also provides call modeling functionality that allows multiple calls to be modeled.

To illustrate the operation of the intelligent network 12 to provide intelligent network functionality to the telecommunications network 10 and the ATM network 18, the establishment of a SVC for VToA is illustrated next. Assuming that the calling party location 20 initiates the establishment or setup of an ATM SVC for VToA with the telephony device 28 of the called party location 22, the CPE 26 of the calling party location 20 responds to the request by the telephony device 24 to setup a phone call. The CPE 26 generates an input ATM setup message and provides this input ATM setup message to the ATM edge switch 14. The ATM edge switch 14 may be thought of as having a device side portion and a network side portion, just like the ATM edge switch 16. The input ATM setup message is received at the device side of the ATM edge switch 14 and is intercepted by the ASIP 40.

The ASIP 40 processes the input ATM setup message and, using one or more of the various values that may be stored within or in association with the input ATM setup message, generates an input. The input is then communicated or provided to the MSCP 44. The MSCP 44 may provide any number of telephony services and features. The MSCP 44, however, must analyze the input to determine if the input ATM setup message is a request for a SVC for VToA. In a preferred embodiment, a predefined or predetermined value is stored within the called party number parameter of the input ATM setup message. The value provided within this called party number parameter of the input ATM setup message is analyzed to determine if the input ATM setup message is requesting a SVC for VToA. In one embodiment, the value stored within the called party number parameter of the input ATM setup message may be referred to as a VToA designator, i.e., designating that the input ATM setup message is a request for a SVC for VToA. It should be understood, however, that any of a variety of ATM setup messages parameters may be used to provide this functionality. The CPE 26, which originally generated the input ATM setup message, will store the appropriate VToA designator value within the appropriate parameter, such as the called party number parameter, when generating the input ATM setup message so that the appropriate MSCP associated with the ingress ATM edge switch will recognize the input ATM setup message as one requesting a SVC for VToA.

If the VToA designator is not found, the MSCP 44 will provide an output to the ASIP 40 and the ATM setup message will continue as if a request is being made to establish or setup a SVC for a data transfer. If the VToA designator is found, additional service and feature processing may proceed. In order for the SVC for VToA to be established, a called party phone number value, which will be included as part of the input from the ASIP 40, will need to correlated by the MSCP 44 with a corresponding value that is equal to the ATM address of the called party CPE, which is in this case is the CPE 30. If the called party phone number value is not found, the call may fail or be rejected. The ATM address of the called party CPE and the called party phone number value, along with any other values generated as a result of the processing that may have occurred through any of a variety of services and features that may be provided by the MSCP 44, results in the MSCP 44 generating an output. The output is received and used by the ASIP 40 to generate or assemble an output ATM setup message.

The output ATM setup message may then be provided to the network side of the ATM edge switch 14 where it is then routed through the ATM network 18 using traditional or available ATM protocols until the output ATM setup message is received at the network side of the ATM edge switch 16. Of course, the ATM network 18 may include any of a variety or any number of ATM switches, such as the ATM switches 18a, 18b, 18c, and 18d. It should also be noted that any number of additional ATM edge switches may be connected to the ATM network 18 through virtually any available ATM switch or ATM network element.

The output ATM setup message is received at the network side of the ATM edge switch 16 where the ASIP 42 intercepts the signaling message and generates an input. The input is provided from the ASIP 42 to the MSCP 46. The MSCP 46, similar to the MSCP 44, analyzes the input to determine what, if any, processing is needed. In this case, the MSCP 46 finds the ATM address of the called party CPE, which in this case is the CPE 30, in the input and provides appropriate routing information and generates a corresponding output of the MSCP 46. Of course, various other processing may also occur, depending on the particular feature or service.

The ASIP 42 receives the output from the MSCP 46 and generates or assembles another setup message. In one embodiment, the resulting ATM setup message may be referred to as a destination or gateway ATM setup message since it will ultimately be provided to the CPE 30, which may be implemented as an enterprise gateway, a network gateway or any of a variety of telephony access devices. If the output ATM setup message is not changed by the output from the MSCP 46, the resulting ATM setup message may still be referred to as the output ATM setup message and it is provided to the device side of the ATM edge switch 16, just like any destination or gateway setup message, where it is then provided to the CPE 30.

At the CPE 30, the appropriate telephony device, in this case telephony device 28, is contacted so that a call may be established or setup. In response, the CPE 30 may generate an ATM connection message or any other ATM signaling message which is available and would be known of ordinary skill in the art. For example an ATM connection message and an ATM release message may be generated during this VToA call.

Figure 2:
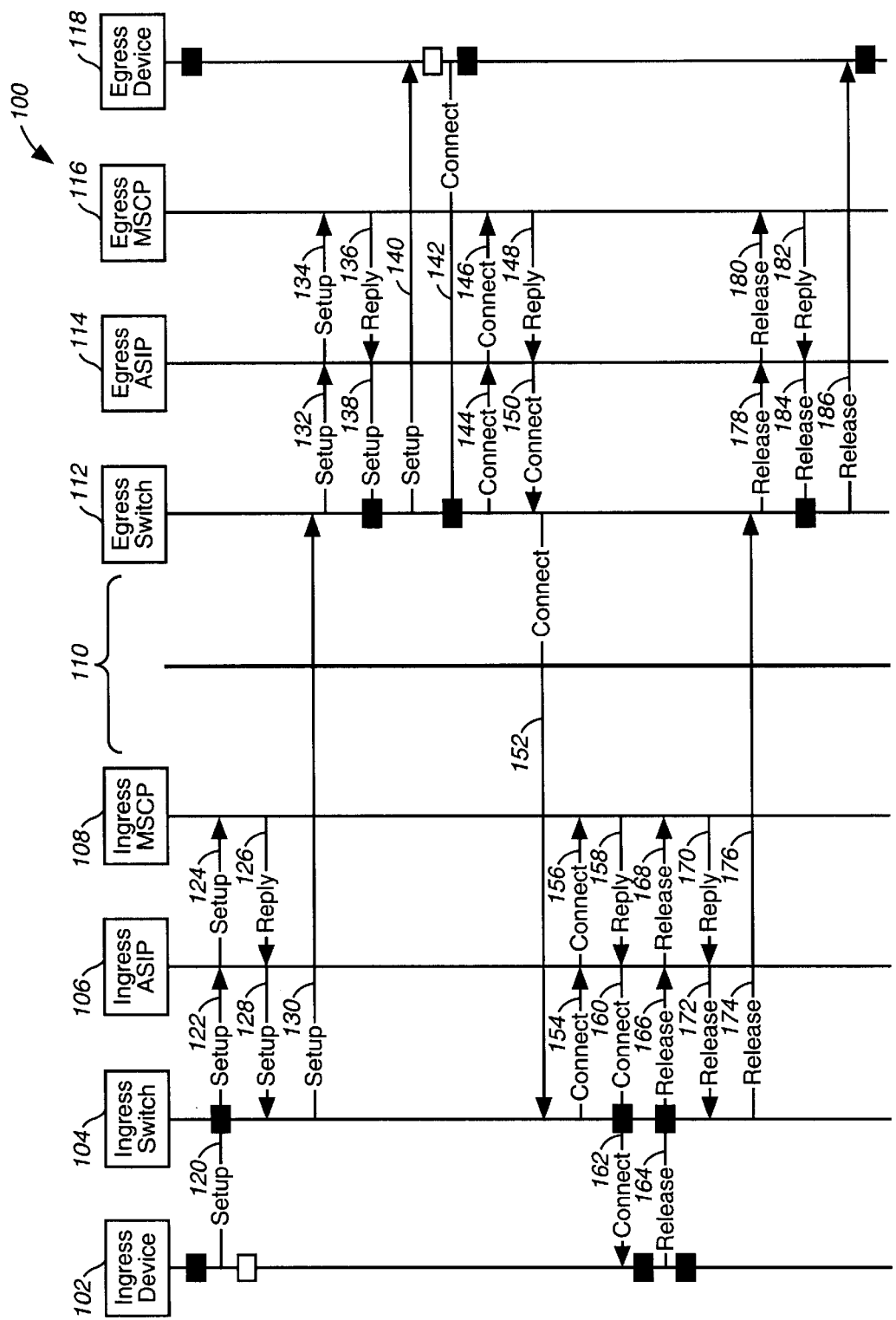
FIG. 2 is a line diagram that illustrates the signaling and call flow performed by the intelligent network for a VToA call, including the setup, connect, and release portions, according to an embodiment of the present invention.

FIG. 2 is a line diagram 100 that illustrates the signaling and call flow performed by the intelligent network for a VToA call, including the setup, connect, and release portions of the VToA call, according to an embodiment of the present invention. The VToA call is achieved through the use of an ingress device 102, an ingress ATM edge switch 104, an ingress ASIP 106, and ingress MSCP 108, an ATM network 110, an egress ATM edge switch 112, an egress ASIP 114, an egress MSCP 116, and an egress device 118. Starting in the upper lefthand portion of FIG. 2, an input ATM setup message is generated and provided from the ingress device 102 to the ingress ATM edge switch 104.

The ingress device 102 may be any of a variety of devices such as the CPE 26 of FIG. 1, a router, a PBX, a telephony access device, or a gateway, such as an enterprise gateway or a network gateway to provide access to the Public Switched Telephone Network ("PSTN"). Generally, the ingress device 102 must simply have the capability to generate an input ATM setup message that includes a VToA designator stored in the called party number parameter of the input ATM setup message (or other location or parameter depending on the intelligent network design), and a called party phone number value stored in the called party subaddress parameter of the input ATM setup message. In other embodiments, the input ATM setup message may also contain the value of the ATM address of the calling party CPE and the calling party phone number value. In such a case, these values are preferably stored in the calling party number parameter and the calling party subaddress parameter, respectively, of the input ATM setup message. Line 120 represents the communication of the input ATM setup message from the ingress device 102 to the ingress ATM edge switch 104.

It should be noted that the line diagram 100 illustrates only the basic signaling and call flow of a VToA call. Other signals or messages, which would be understood by one of ordinary skill in the art and normally provided automatically as part of one or more ATM specifications, may include various acknowledgment signals or messages, such as connect acknowledge, a call proceeding message, and a release complete message.

The ingress ATM edge switch 104 receives the input ATM setup message and communicates it to the ingress ASIP 106 as represented by a line 122. The ingress ASIP 106 provides various values and addresses contained within various parameters of the input ATM setup message and provides those values to the ingress MSCP 108 as shown in a line 124. For example, the ingress ASIP 106 may provide the VToA designator, which may be stored in the called party number parameter of the input ATM setup message, and the called party phone number value, which may be stored in the called party subaddress parameter of the input ATM setup message, to the ingress MSCP 108. The VToA designator is used in the present invention to indicate that a setup message is requesting to set up a SVC for VToA.

After the ingress MSCP 108 confirms, by analyzing the value of the VToA designator, that a SVC for VToA is requested, the ingress MSCP 108 may perform any of a variety of advanced telephony functions to provide VToA services and features as desired or requested. If a VToA designator is not found by the MSCP 108 during setup, an ATM data call may be assumed. The ingress MSCP 108 may provide any of a variety of advanced telephony functions to provide VToA services and features. Example of some of these services and features include Default Calling Party Number Handling ("DCH"), Source Address Validation ("SAV"), Customer Port Maximum Call Attempt Rate Limit ("CMR"), Closed User Group ("CUG"), Destination Address Screening ("DAS"), Source Address Screening ("SAS"), Customer Port Maximum Burst Size Limit ("CMDS"), Customer Port Aggregate Bandwidth Limit ("CBW"), Customer Port Maximum Concurrent Calls in Progress Limit ("CMC"), Private Address Translation ("PAT"), Customer Port Service Class Selection ("CSCS"), and Point-to-Multipoint, Root-Initiated Connections ("P2MR"). Preferably, most of the intelligent network features and processing are performed at the ingress MSCP 108. In some cases, such as, for example, PAT, additional intelligent networking service or feature processing must be performed at other locations, such as the egress MSCP 116.

A brief summary of the calling services and features mentioned above is provided. DCH provides logic to handle input ATM setup messages in which a calling party phone number value is not provided. In such a case, the DCH feature may substitute a default calling party phone number value. SAV determines whether a user is requesting a call through an authorized or proper port. VToA privileges may be given on a per port basis, and the SAV feature may insure that only authorized users are allowed to access the ATM network through particular network ports, such as a physical port or a Customer Logic Port ("CLP") CMR may be used to verify that the number of access attempts at a CLP does not exceed a provisioned or predetermined rate.

The CUG feature allows various users of an enterprise or customer to be partitioned into defined user groups. This allows various policies or privileges to be enforced on a group basis. A basic feature of CUG is to provide the capability to restrict calls to other users outside of the CUG or within certain other closed user groups. The DAS and SAS services or features provide call-screening lists that allow either the originating party or the terminating party to define the addresses to which calls can be made or from which calls can be received, respectively. In one embodiment, two types of call-screening lists may be supported for each user or subscriber that include a group list and a user list. This allows these services or features to be provided either on a group basis, an individual user basis, or both. The CBS and CEW services or features provide a mechanism in which burst-size and bandwidth requests may be limited. This may prevent a few users from allocating large amounts of bandwidth and ATM network capability at the expense of other users. Similarly, the CMC feature limits the number of connections through a particular port.

The PAT service, which will be described more fully below in the description accompanying FIGS. 5, 6, 7, 8a, 8b, 9a and 9b, provides the significant advantage of allowing a customer to keep its own ATM numbering or addressing scheme. PAT is an example of a feature that requires ATM intelligent network processing, according to an embodiment of the present invention, at both the ingress ATM edge switch and the egress ATM edge switch.

The CSCS feature provides a mechanism to configure the service classes available for a particular customer, which may be set up through an individual CLP. As an example, CSCS may support the capability to configure various classes of service such as Continuous Bit Rate ("CBR"), Variable Bit Rate, Non-Real Time ("VBR-NRT"), Variable Bit Rate, Real Time ("VBR-RT"), Unspecified Bit Rate ("UBR"), and Available Bit Rate ("ABR"). The P2MR feature or service allows for point-to-multipoint VToA to be provided using a SVC. These types of connections are unidirectional and, just as with point-to-point connections, can support virtually any type of content such as voice or video.

Referring back to FIG. 2, the ingress MSCP 108 will provide any of a number of various features, such as those just described, by performing any of a number of database or table queries and executing any of a number of applications or algorithms. As a result, the ingress MSCP 108 provides an output back to the ingress ASIP 106 as represented by the line 126. This output will be used by the ingress ASIP 106 to generate an output ATM setup message. The output will normally include an ATM address of the called party CPE. The CPE may be implemented as, for example, an enterprise gateway, a network gateway, or virtually any other telephony access device. The ingress ASIP 106 assembles or generates the output ATM setup message and provides this message to the ingress ATM edge switch 104 as represented by a line 128 of FIG. 2.

The output ATM setup message then passes through the ATM network 110 until it reaches the egress ATM edge switch 112. This is represented by a line 130. Similar to how the input ATM setup message was processed by the ingress devices, the egress devices process the output ATM setup message. Initially, the output ATM setup message is intercepted by the egress ASIP 114 once it reaches the egress ATM edge switch 112. This is represented by a line 132.

The egress ASIP 114 transfers various input values from the output ATM setup message to the egress MSCP 116. The egress MSCP 116 may provide various processing, but as mentioned above, most of the intelligent network service or feature processing will, preferably, be performed at the ingress side. The egress MSCP, in one embodiment, receives the ATM address of called party CPE and determines which port of the egress ATM edge switch 112 the setup message should be provided so that it may be communicated to the egress device 118. The egress MSCP 116, depending on the processing performed, may modify the input provided from the egress ASIP 114 and generate an output that is provided back to the egress ASIP 114, which is represented by a line 136 in FIG. 2.

The egress MSCP 116 may provide various applications, logic, and the like to carry out any of a variety of advanced intelligent network features. The egress MSCP 116 may contain various data provided in tables or databases, or have the capability to access data external to the egress MSCP 116. It should also be noted that the features or services provided by the egress MSCP 116 and the ingress MSCP 108 may be achieved by the same MSCP. The ASIPs, however, will generally be associated or dedicated to each ATM edge switch that the ASIP serves. It should also be noted that although the egress MSCP 116 is shown in FIG. 2 serving as an egress device 118, whenever the egress device 118 originates a SVC for VToA over the ATM network 110, the egress MSCP 116 will generally function as just described for the ingress MSCP 108.

The egress device 118, just as with the ingress device 102 described above, may be virtually any available CPE device such as, for example, an enterprise gateway, a network gateway, or a telephony access device. If the egress device 118 is an enterprise gateway, the egress MSCP 116 will generally not modify the input provided to it from the egress ASIP 114 and thus the egress ASIP 114 will receive an output from the egress MSCP 116 that is the same or similar as the input. In such a case, the output ATM setup message is provided to the egress ATM edge switch 112 where it is then provided to the egress device 118 to establish a SVC for VToA. This is represented by lines 138 and 140.

If the egress device 118 is a network gateway, or some similar device, the egress MSCP 116 may perform database operations to properly route the setup message to the egress device 118. In such a case, the egress MSCP 116 generates appropriate output and provides this output to the egress ASIP 114, as represented by the line 136. The egress ASIP 114 then assembles or generates another ATM setup message, which may be referred to as a destination or gateway ATM setup message, and provides this setup message to the egress ATM edge switch 112, which then provides such message to the egress device 118. This is represented by lines 138 and 140.

Once a party answers a telephony device, the egress device 118 generates an ATM connect message. This connect message is illustrated in FIG. 2 by lines 142–162. The ATM connect message propagates through the ATM network 110 until a connection is made between the ingress device 102 and the egress device 118. The ATM connection message is processed, similar to the ATM setup message, such that the ingress and egress ASIPs and MSCPs intercept and analyze each such signaling messages. At this point, a SVC has been established between the ingress device 102 and the egress device 118 through the ATM network 110 to provide VToA with intelligent network services and features. The MSCP and the ASIP may also provide call modeling to track various calls.

Once a party desires to end the call, which can come from either the ingress device 102 or the egress device 118, an ATM release message is generated. In FIG. 2, this ATM release message is generated by the ingress device 102. This proceeds similar to the connect and setup messages and is illustrated in FIG. 2 by the lines 164–186. This ends the VToA call.

Figure 3:
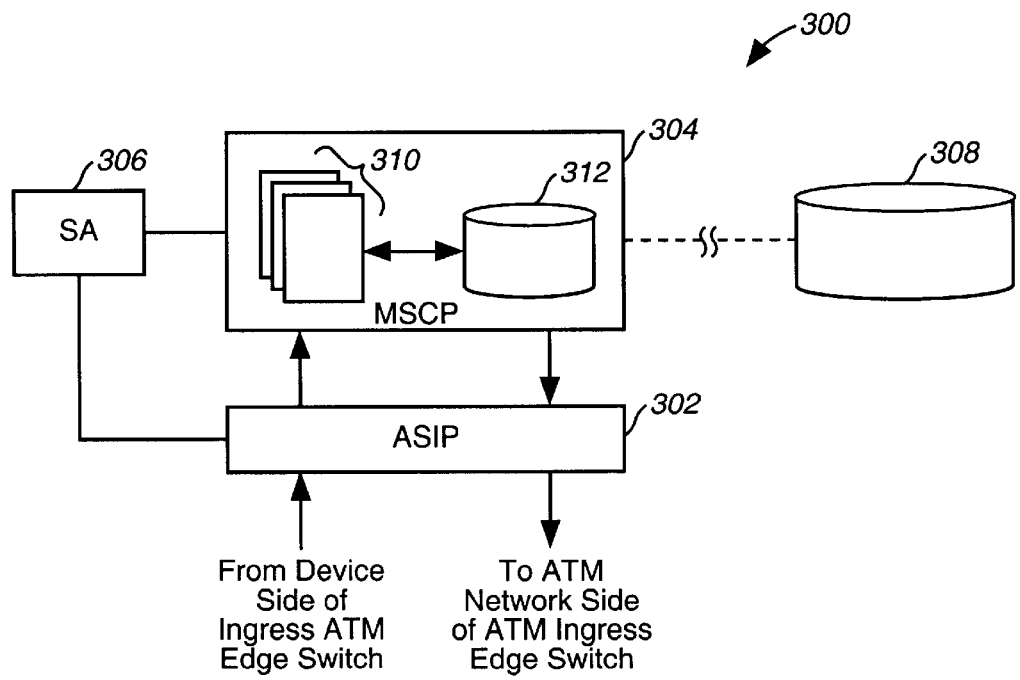
FIG. 3 is a block diagram that illustrates an intelligent network used at the ingress side of an ATM network for providing VToA services, such as private address translation, using an ATM switched virtual circuit.

FIG. 3 is a block diagram that illustrates an intelligent network 300 used at the ingress side of an ATM network for providing VToA services using an ATM switched virtual circuit. The intelligent network 300 includes an ASIP 302, an MSCP 304, and a service administration 306. A remote, external database 308 is also shown in FIG. 3 with a communications link with the MSCP 304. The database 308 is provided to illustrate the fact that the MSCP 304 may rely on external databases or tables. The service administration 306 may also contain various tables or databases that the MSCP 304 accesses or that is provided to the MSCP 304 as a database of record.

The ASIP 302 interfaces with an ATM edge switch, not shown in FIG. 3, and is capable of intercepting and receiving ATM message signals, such as ATM setup, connect, and release messages. When the ATM edge switch serves as the ingress ATM edge switch, the ASIP 302 receives ATM signaling messages from the device side of the ingress ATM edge switch. To establish a SVC to provide VToA, the ingress ATM edge switch provides an input ATM setup message from its device side to the ASIP 302. In addition to the functions described next, the ASIP 302 may also provide call modeling functionality. The ASIP 302 receives the input ATM setup message and, in one embodiment, extracts various information, such as the called party phone number value and the VToA designator, and communicates this information to the MSCP 304 as an input. The communications link between the MSCP 304 and the ASIP 302 may be a local connection or it may be a remote or long distance link. In one embodiment, the called party phone number value is stored in the called party subaddress parameter of the input ATM setup message and the VToA designator is stored in the called party number parameter of the input ATM setup message.

The MSCP 304, which also may be referred to as a policy server, includes various applications 310 and a database 312. The applications 310 may include any of a variety of software programs, logic, and algorithms that serve to provide VToA services and features. The database 312 may include any of a variety of tables and information useful to provide VToA services and features.

The service administration 306 is capable of provisioning the MSCP 304, and in some embodiments, the ASIP 302. The service administration 306 may control or synchronize multiple MSCPs ensure that data or information in various MSCPs of the ATM network are coordinated and consistent.

The MSCP 304 receives the input from the ASIP 302 and can provide any number of VToA services and features. In order to establish a SVC for VToA, the MSCP 304 must determine if the input, provided by the ASIP 302 from the input ATM setup message, is a request to establish a SVC for VToA. If not, processing of an ATM data call proceeds. The MSCP 304, in a preferred embodiment, determines that the input ATM setup message is requesting a SVC to establish VToA by looking for the presence of the VToA designator. If present, the MSCP 304 uses the database 312 to determine the ATM address of the called party CPE using the called party phone number value provided as an input from the ASIP 302. The MSCP 304 may provide any of a variety of additional services and features, such as those described above in connection with FIG. 2, and will, generally, use the applications 310 and the database 312 to achieve these services and features. The MSCP 304 generates an output in response to the processing just described and communicates this output to the ASIP 302. If a VToA is to be set up, the output will generally include at least the called party phone number value and the ATM address of the called party CPE.

To illustrate some of the processing that may be performed by the MSCP 304 on the input provided by the ASIP 302, the following examples are provided. Assuming that an ATM address of the calling party CPE is provided as part of the input ATM setup message, and preferably as the calling party number parameter, the ASIP 302 may provide this as an input to MSCP 304. The value of this address is then used to determine what services or features are available for this particular address. The MSCP 304 may also, by examining the value of the called party phone number value provided in the called party subaddress parameter of the input ATM setup message, determine or perform database queries to determine if the requested call is to a private number, a long distance or international number, a local number, an emergency number, etc. In a preferred embodiment, this is performed using various tables, which may be provided in the database 312, and by examination of the prefix digits of the called party phone number value. The MSCP 304 may also remove or add prefix or suffix digits to the called party phone number value. The result of any such prefix/suffix manipulation results in a revised called party phone number value. This revised number may then be used to determine a corresponding ATM address of the called party CPE.

The MSCP 304 may also, depending on the features and capabilities associated with one or more of the calling party phone number value, the ATM address of the calling party CPE, and the called party phone number value, consult a database or table of provisioned information to determine whether the called party phone number value should be translated to some other phone number and whether permission to make such a call is available. For example, the destination party may have forwarded their phone number to another phone number. In such a case, the MSCP 304 may determine that the called party phone number value should be translated to another called party phone number value. In such a case, the MSCP 304 may request whether the calling party has permission or sufficient rights to place a call to the translated or forwarded called party phone number.

As a result of the various manipulations and features and services provided by the MSCP 304, an output is provided to the ASIP 302. The ASIP 302 assembles or generates an output ATM setup message using the output from the MSCP 304. In a preferred embodiment, the resulting called party phone number value is stored in the called party subaddress parameter of the output ATM setup message, and the original calling party phone number value is stored in the calling party subaddress of the output ATM setup message. In addition, the output ATM setup message may include the ATM address of the calling party CPE stored in the calling party number parameter, and the calling party phone number value stored in the calling party subaddress. As an example, the following two tables illustrate various parameters and corresponding values or addresses of the input ATM setup message and the output ATM setup message.

| INPUT ATM SETUP MESSAGE | |
|---|---|
| PARAMETERS | VALUE |
| Called Party Number | VToA designator |
| Called Party Subaddress | called party phone number value |
| Calling Party Number | ATM address of the calling party CPE |
| Calling Party Subaddress | calling party phone number value |

| OUTPUT ATM SETUP MESSAGE | |
|---|---|
| PARAMETERS | VALUE |
| Called Party Number | ATM address of the called party CPE |
| Called Party Subaddress | called party phone number value |
| Calling Party Number | ATM address of the calling party CPE |
| Calling Party Subaddress | calling party phone number value |

The ASIP 302 provides the output ATM setup message to the ATM network side of the ATM ingress edge switch where the output ATM setup message is provided to the ATM network and eventually delivered at the appropriate egress ATM edge switch to establish the SVC for VToA.

Figure 4:
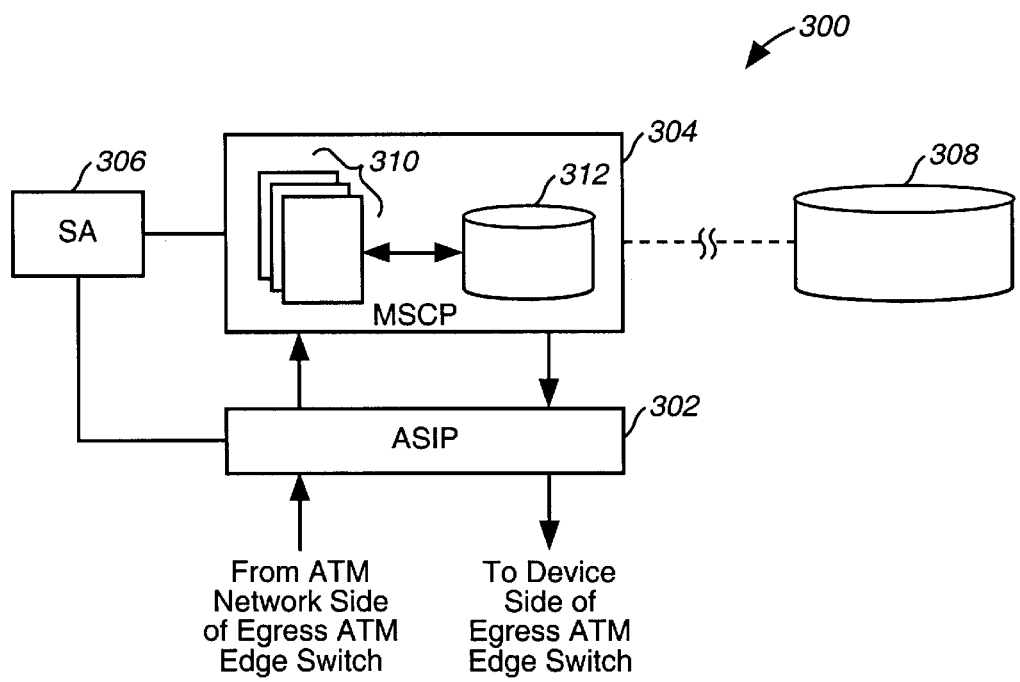
FIG. 4 is a block diagram that illustrates the intelligent network used at the egress side of the ATM network for providing VToA services, such as private address translation, using an ATM switched virtual circuit.

FIG. 4 is a block diagram that illustrates the intelligent network 300 used at the egress side of the ATM network, such as the ATM network 18 of FIG. 1, for providing VToA services and features using an ATM switched virtual circuit. Thus, in one embodiment of the present invention, the ASIP 302 and the MSCP 304 may provide intelligent network services and features to an ATM edge switch serving as an ingress ATM edge switch and an egress ATM edge switch, depending on how a VToA call is established.

When serving the associated ATM edge switch that is functioning as an egress switch, the intelligent network 300 receives the output ATM setup message from the ATM network. As mentioned above, the egress ATM edge switch may be considered part of the ATM network. The egress ATM edge switch provides the output ATM setup message to the ASIP 302.

The ASIP 302 intercepts the output ATM setup message from the egress ATM edge switch and generates or extracts an input to provide to the MSCP 304. This input may include any of a variety of values provided by the output ATM setup message. For example, the input may include the ATM address of the called party CPE.

At the egress side, the MSCP determines the appropriate port or CLP of the egress ATM edge switch in which to route the ATM setup message. The MSCP 304, however, may provide any of a variety of services and features, and may provide additional routing information.

In the event that the MSCP 304 generates an output such that the ASIP 302 assembles or generates an ATM setup message that is different from the output ATM setup message, this new ATM setup message may be referred to as a destination or gateway ATM setup message. In any event, the ASIP 302 provides the ATM setup message to the device side of the egress ATM edge switch so that the ATM setup message may be provided to the appropriate CPE. Of course, the CPE may be provided as any number of devices such as an enterprise gateway, a network gateway, or various other telephony equipment. The CPE will generally interpret the ATM setup message by looking at the called party phone number value stored, preferably, in the called party subaddress parameter of the ATM setup message to determine how to make the final connection to the appropriate telephony device.

Figure 5:
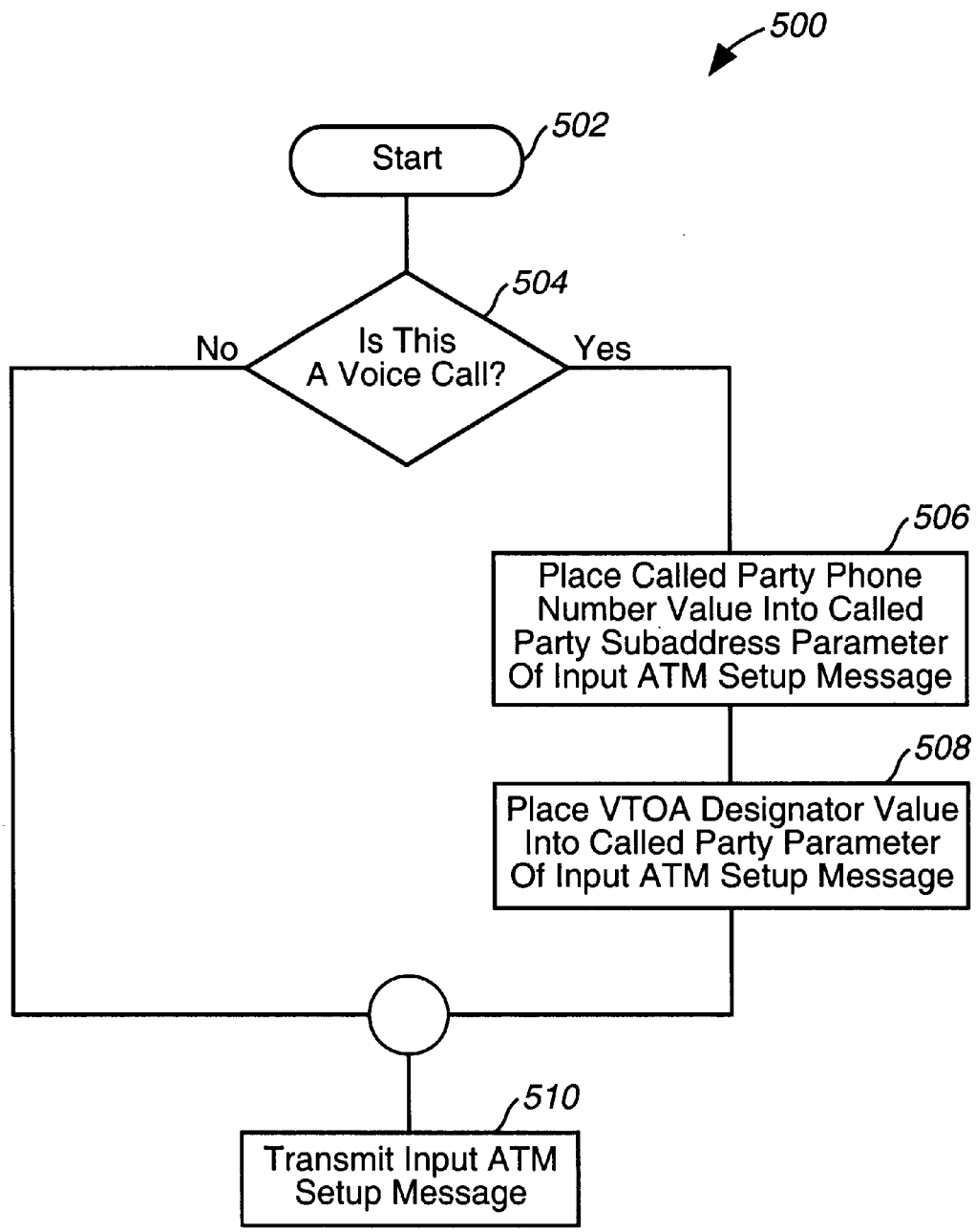
FIG. 5 is a flowchart that illustrates a method of generating an input ATM setup message at a calling party CPE from a private network and that supports private address translation.

FIG. 5 is a flowchart that illustrates a method 500 of generating an input ATM setup message at a calling party CPE, which may also be referred to as an ingress CPE, provided at a private network. For example, the private network may interface with a public or other ATM network such that the ATM addresses of the private network are incompatible or in conflict with the ATM addresses of the public or other ATM network. Private address translation of the present invention solves this significant problem.

The method 500 begins at block 502 and proceeds to decision block 504. If a voice call, such as a VToA call, is to be made, the method 500 proceeds along the "YES" branch to the block 506. If an ATM data call is to be made that does not provide VToA, the method 500 proceeds from the decision block 504 through the "NO" branch. Assuming a voice call is to be made, the method 500 proceeds to block 506. At block 506 and block 508, the calling party CPE, which may be implemented as a gateway, generates an input ATM setup message that includes various values stored in designated parameters. For example, in a preferred embodiment, a called party phone number value is stored in a called party subaddress parameter of the input ATM setup message. This is reflected in FIG. 5 at block 506. Similarly, a VToA designator value is stored in the called party number parameter of the input ATM setup message. The method 500 then proceeds to block 510 where the input ATM setup message is transmitted to the telecommunications network, such as the ingress ATM edge switch 14 of the telecommunications network 10 of FIG. 1.

Assuming that method 500 is used to set up an ATM data call, although not expressly illustrated in FIG. 5, the method 500 will place or store an ATM address of the called party in the called party number parameter of the input ATM setup message. The ATM address of the called party may be from a private ATM network and may not be compatible with the telecommunications network that it is to be transmitted through. This input ATM setup message is then provided to the telecommunications network as was just described in connection with the input ATM setup message generated for a VToA call.

Figure 6:
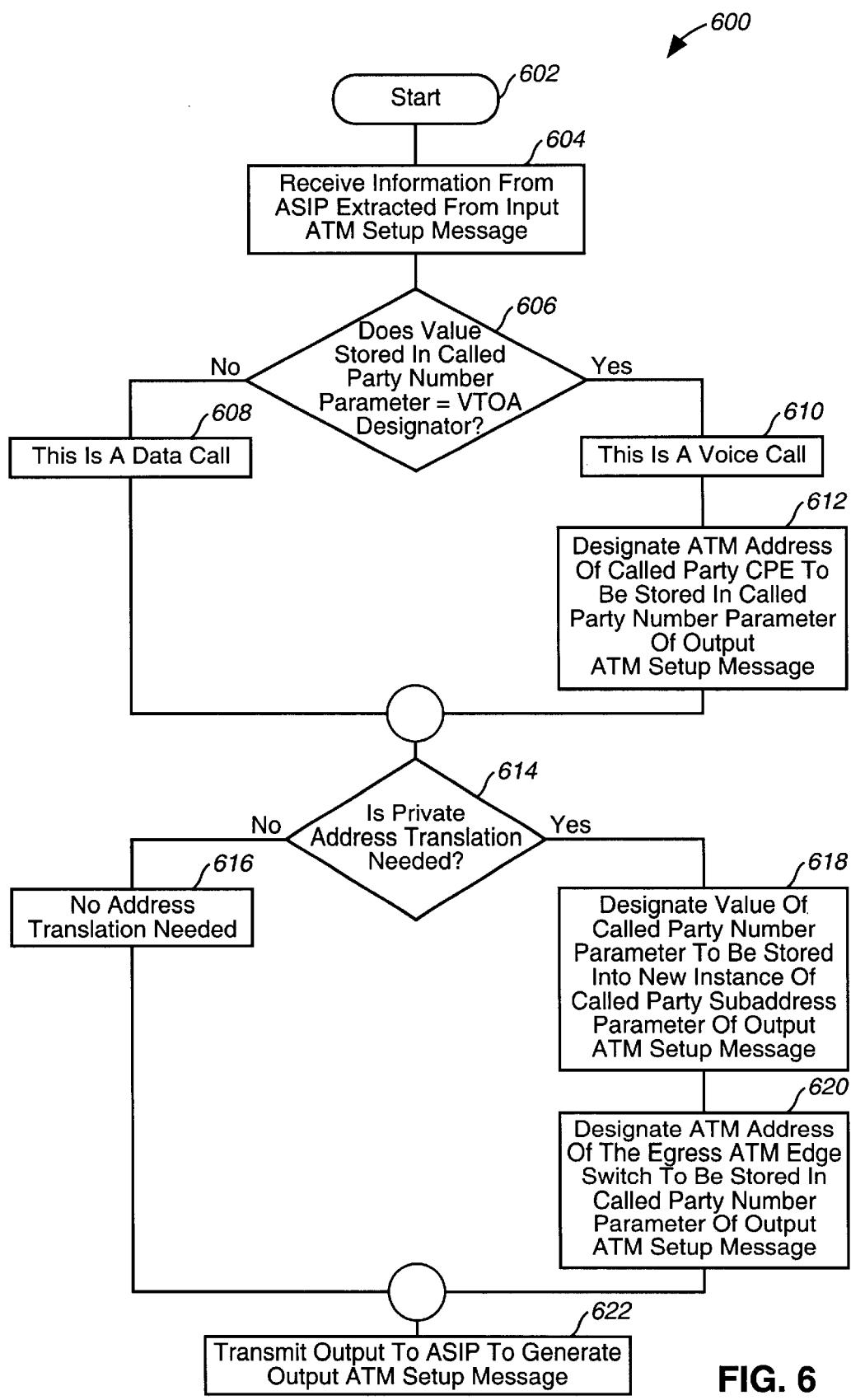
FIG. 6 is a flowchart that illustrates a method of ingress multi-service control point processing to provide private address translation to support VToA and ATM data calls.

FIG. 6 is a flowchart that illustrates a method 600 of ingress MSCP processing to provide private address translation to support VToA and ATM data calls. The method 600 begins at block 602 and proceeds to block 604 where information is received from the ATM signaling intercept processor that has been extracted from the input ATM setup message. If the input ATM setup message is provided to establish a VToA call, the ATM signaling intercept processor will have, preferably, extracted the VToA designator value and the called party phone number value, which may have been provided by a private ATM network. If the input ATM setup message is provided to establish an ATM data call, the ATM signaling intercept processor will have, preferably, extracted the ATM address of the called party, which also may be an ATM address of a private party.

The method 600 proceeds to decision block 606 where, in a preferred embodiment, it is determined whether the VToA designator is stored in the called party number parameter of the information that was provided in block 604. If so, the method 600 proceeds through the "YES" branch to block 610, otherwise the method 600 proceeds through the "NO" branch to block 608.

If the VToA designator is not found in the called party number parameter, the ingress MSCP will assume that this is an ATM data call, as designated in block 608. Otherwise, at block 610 it is recognized that this is a voice call because of the presence of the VToA designator in the designated parameter of the information.

The method 600 then proceeds to block 612 where the ATM address of the called party CPE is designated to be stored in the called party number parameter of an output ATM setup message, which will be generated by the ASIP at the end of method 600. In a preferred embodiment, the ATM address of the called party CPE will be determined using the called party phone number value and a database to provide a cross-reference to such an ATM address.

The method 600 proceeds to decision block 614 where it is determined whether private address translation is needed or requested. In a preferred embodiment, private address translation will be determined on a customer-by-customer basis. For example, if a first customer desires to have private address translation, then this will be provided to all ATM setup requests from such first customer. This can be determined by the port of the ingress ATM edge switch in which all ATM setup messages from such first customer are received. In other embodiments, a database or other corresponding techniques may be used to identify the input ATM setup message as one that needs or requires private address translation.

At decision block 614, the method 600 proceeds to block 616 if no private address translation is needed. If so, the method 600 then proceeds to block 622, which will be discussed more fully below. Otherwise, if private address translation is needed, then method 600 proceeds to block 618.

At block 618, which may involve information from an input ATM setup message designed to set up either a VToA call or an ATM data call, the value stored in the called party number parameter is designated to be stored into a called party subaddress parameter of the output ATM setup message. For example, if the input ATM setup message at issue is one to set up a VToA call, the value of the called party number parameter, in a preferred embodiment, is the ATM address of the called party CPE, which according to block 618, will be designated to be stored in a new instance of the called party subaddress parameter of the output ATM setup message. In effect, the present invention utilizes the fact that an ATM called party subaddress parameter may include more than one instance. This will be illustrated after the description accompanying FIG. 7 with various tables that show how, in a preferred embodiment, the various values are stored in corresponding parameters of an ATM setup message as they proceed from the ingress MSCP to the egress MSCP.

Referring still to block 618, in a situation where the ATM setup message is provided to establish an ATM data call, the value of the called party number parameter will be the ATM address of the called party, which, according to block 618, will now be designated to be stored into the called party subaddress parameter of the output ATM setup message, which will be generated later. It should be noted that in the situation of an ATM data call, it is not necessary or required that more than one value be stored in the called party subaddress parameter of the output ATM setup message.

The method 600 proceeds next to block 620 where the ATM address of the egress ATM edge switch is designated to be stored in the called party number parameter of the output ATM setup message. This will allow the output ATM setup message to be properly routed through the public or non-private ATM network. The method 600 then proceeds to block 622 where the method ends as the ingress MSCP transmits output to the ASIP associated with the ingress ATM edge switch so that the ASIP may generate the output ATM setup message, as designated by the MSCP.

The ASIP associated with the ingress ATM edge switch will generate the output ATM setup message that includes the ATM address of the egress ATM edge switch stored in the called party number parameter, for both a VToA call and an ATM data call. As to VToA calls, in a preferred embodiment the ASIP will proceed to generate the output ATM setup message by including the ATM address of the called party CPE stored in the first instance of the called party subaddress parameter, and the called party phone number value stored in the second instance of the called party subaddress parameter. As to an ATM data call, in a preferred embodiment the ASIP will proceed to generate the output ATM setup message by storing the ATM address of the called party in the second parameter, which will preferably be the called party subaddress. As is illustrated, the potentially conflicting addresses of the private ATM networks are successfully stored in parameters of the output ATM setup message such that they are not used to route the ATM setup message through the public ATM network, thus solving the problem of conflicting ATM addresses through private address translation.

Figure 7:
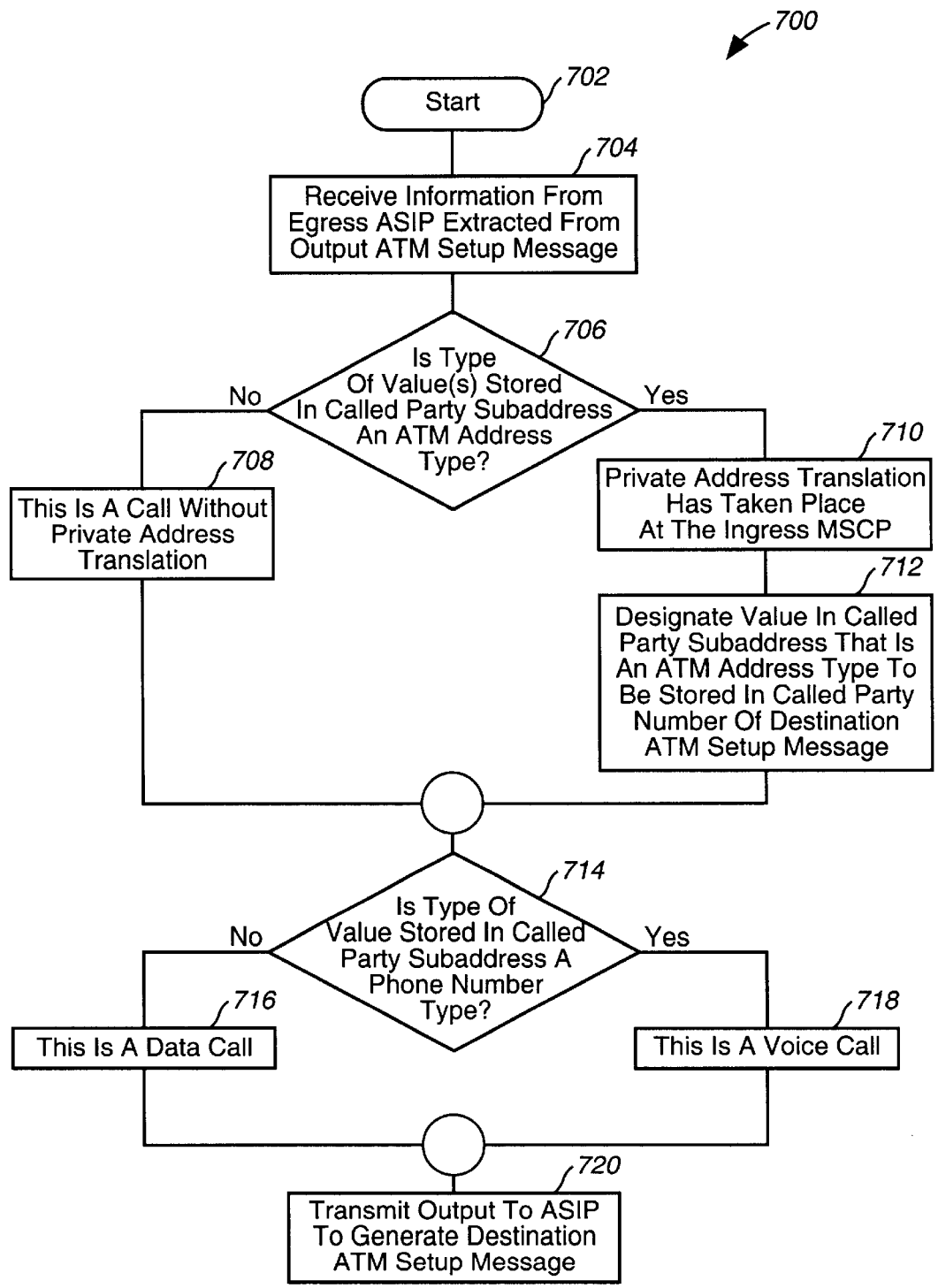
FIG. 7 is a flowchart that illustrates a method of egress multi-service control point processing to provide private address translation to support VToA and ATM data calls.

FIG. 7 is a flowchart that illustrates a method 700 of egress MSCP processing to provide private address translation to support VToA and ATM data calls. The method 700 begins at step 702 and proceeds to block 704. At block 704 information is received from the egress ASIP that has been extracted from the output ATM setup message. The information provided in the output ATM setup message, of course, was generated according to method 600 as discussed above in connection with FIG. 6. The method 700 then proceeds to decision block 706.

At decision block 706, the type of values provided from the called party subaddress of the information provided from the output ATM setup message is analyzed to determine if any of these values are provided as an ATM address type. If not, the method 700 proceeds along the "NO" branch to block 708 where it is confirmed that this is an ATM call, either a VToA call or an ATM data call, without private address translation. The method then would proceed to decision block 714. Otherwise, the method 700 proceeds from the decision block 706 to block 710 along the "YES" branch.

The presence of the ATM addresses in the called party subaddress parameter confirms that private address translation has taken place at the ingress MSCP. Proceeding next to block 712, the value in the called party subaddress that is an ATM address type, is designated to be stored in the called party number parameter of the destination ATM setup message. In this manner, the private ATM network will have the appropriate ATM address to properly route and complete either ATM call, which may be either a VToA call or an ATM data call.

The method 700 then proceeds to decision block 714 where it may be determined whether the setup message is for a VToA call or an ATM data call. If the called party subaddress includes a data type that includes a phone number, this will indicate that the setup message is for a VToA call, otherwise it is for an ATM data call. If it is an ATM data call, the method 700 proceeds to block 718 where it is stated that it is a VToA call. Similarly, if it is an ATM data call, the method 700 proceeds along the "NO" branch to the block 716. The method 700 ends at block 720.

At block 720, the output from the egress MSCP is sent to the ASIP associated with the egress ATM edge switch so that this ASIP may generate the destination ATM setup message. The destination ATM setup message will provide the ATM address of the called party, which originated from the private network, as the value stored in the called party number. This is true for both VToA calls and ATM data calls. If the ATM setup message is for a VToA call, the called party phone number value will be stored in the called party subaddress parameter of the destination ATM setup message.

The following tables provide an illustration of the various ATM setup messages as they transition from an input ATM setup message, to an output ATM setup message, and then to a destination ATM setup message. The first three tables illustrate this transition for an ATM setup message for a VToA call that requires private address translation.

| INPUT ATM SETUP MESSAGE (VToA WITH PRIVATE ADDRESS TRANSLATION) ||
|---|---|
| PARAMETERS | VALUE |
| Called Party Number | VToA designator |
| Called Party Subaddress | called party phone number value |

Referring to the table above entitled INPUT ATM SETUP MESSAGE, the VToA designator is shown stored in the called party number parameter, while the called party phone number value is shown stored in the called party subaddress parameter for the input ATM setup message.

| OUTPUT ATM SETUP MESSAGE (VToA WITH PRIVATE ADDRESS TRANSLATION) ||
|---|---|
| PARAMETERS | VALUE |
| Called Party Number | ATM address of the egress ATM edge switch |
| Called Party Subaddress #1 | ATM address of called party CPE (private) |
| Called Party Subaddress #2 | called party phone number value |

Referring to the table just above entitled OUTPUT ATM SETUP MESSAGE, the ATM address of the egress ATM edge switch is shown stored in the called party number parameter. This allows the output ATM setup message to be properly routed through the public or non-private ATM network. As is shown, the ATM address of the called party CPE, which is the private ATM address which may conflict with the ATM addresses of other ATM networks, is shown stored in the first instance of the called party subaddress. Referring still to the same table, the called party phone number value is shown stored in the second instance of the same called party subaddress parameter of the output ATM setup message.

| DESTINATION ATM SETUP MESSAGE (VToA WITH PRIVATE ADDRESS TRANSLATION) ||
|---|---|
| PARAMETERS | VALUE |
| Called Party Number | ATM address of called party CPE (private) |
| Called Party Subaddress | called party phone number value |

Referring now to the table above entitled DESTINATION ATM SETUP MESSAGE, the ATM address of the called party CPE is shown properly stored in the called party number parameter of the destination ATM setup message so that the private network may properly route this VToA call. Since this is a VToA call, the called party phone number value will also be stored in the destination ATM setup message, preferably, in the called party subaddress parameter.

| INPUT ATM SETUP MESSAGE (PRIVATE ADDRESS TRANSLATION - NO VToA) ||
|---|---|
| PARAMETERS | VALUE |
| Called Party Number | ATM address of the called party (private) |

The final three tables illustrate the same transition of the ATM setup message from an input ATM setup message, to an output ATM setup message, and to a destination ATM setup message for an ATM data call, not a VToA call, that requires private address translation. Referring now to the table just above entitled INPUT ATM SETUP MESSAGE, the ATM address of the called party is stored in the called party number parameter. Once the input ATM setup message is received at the ingress ATM edge switch, the intelligent network of the present invention, including the MSCP, will process the various information provided from the input ATM setup message to generate the output ATM setup message.

| OUTPUT ATM SETUP MESSAGE (PRIVATE ADDRESS TRANSLATION - NO VToA) ||
|---|---|
| PARAMETERS | VALUE |
| Called Party Number | ATM address of the egress ATM edge switch |
| Called Party Subaddress | ATM address of the called party (private) |

Referring now to the table just above entitled OUTPUT ATM SETUP MESSAGE, the ATM address of the called party is shown having been moved from the called party number parameter to the called party subaddress parameter of the output ATM setup message. As discussed above, this ensures proper routing by eliminating possible ATM address conflicts. The ATM address of the egress ATM edge switch is stored in the called party number parameter so that the output ATM setup message may be properly routed through the public or non-private ATM network to the appropriate destination location.

| DESTINATION ATM SETUP MESSAGE (PRIVATE ADDRESS TRANSLATION - NO VToA) ||
|---|---|
| PARAMETERS | VALUE |
| Called Party Number | ATM address of called party (private) |

Referring now to the table entitled DESTINATION ATM SETUP MESSAGE, the ATM address of the called party is moved back to the called party number parameter so that it may be properly routed through the private ATM network.

Figure 8A:
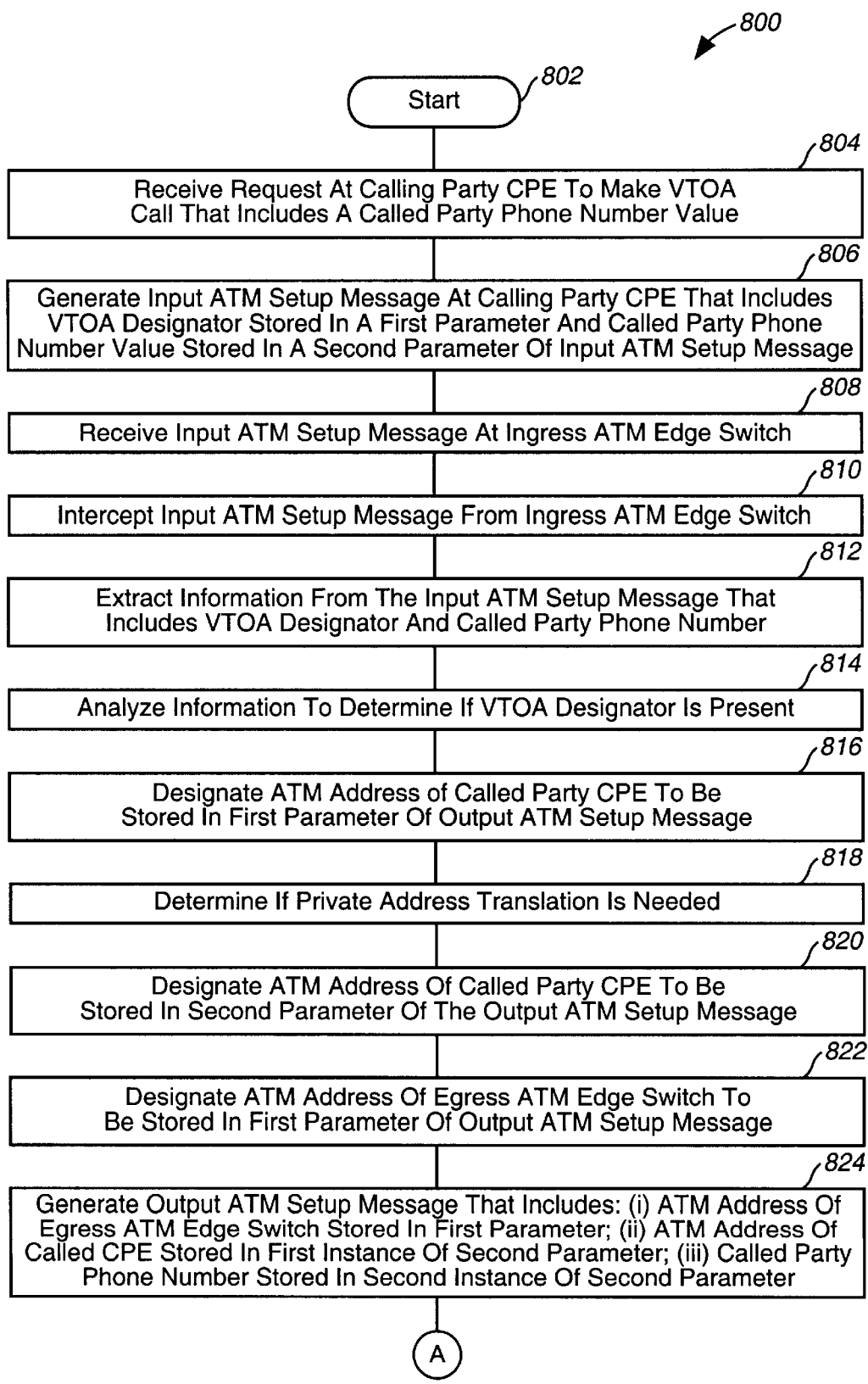
FIGS. 8a and 8b are flowcharts that illustrate a method for providing VToA services and private address translation using an intelligent network and a switched virtual circuit over an ATM network.
Figure 8B:
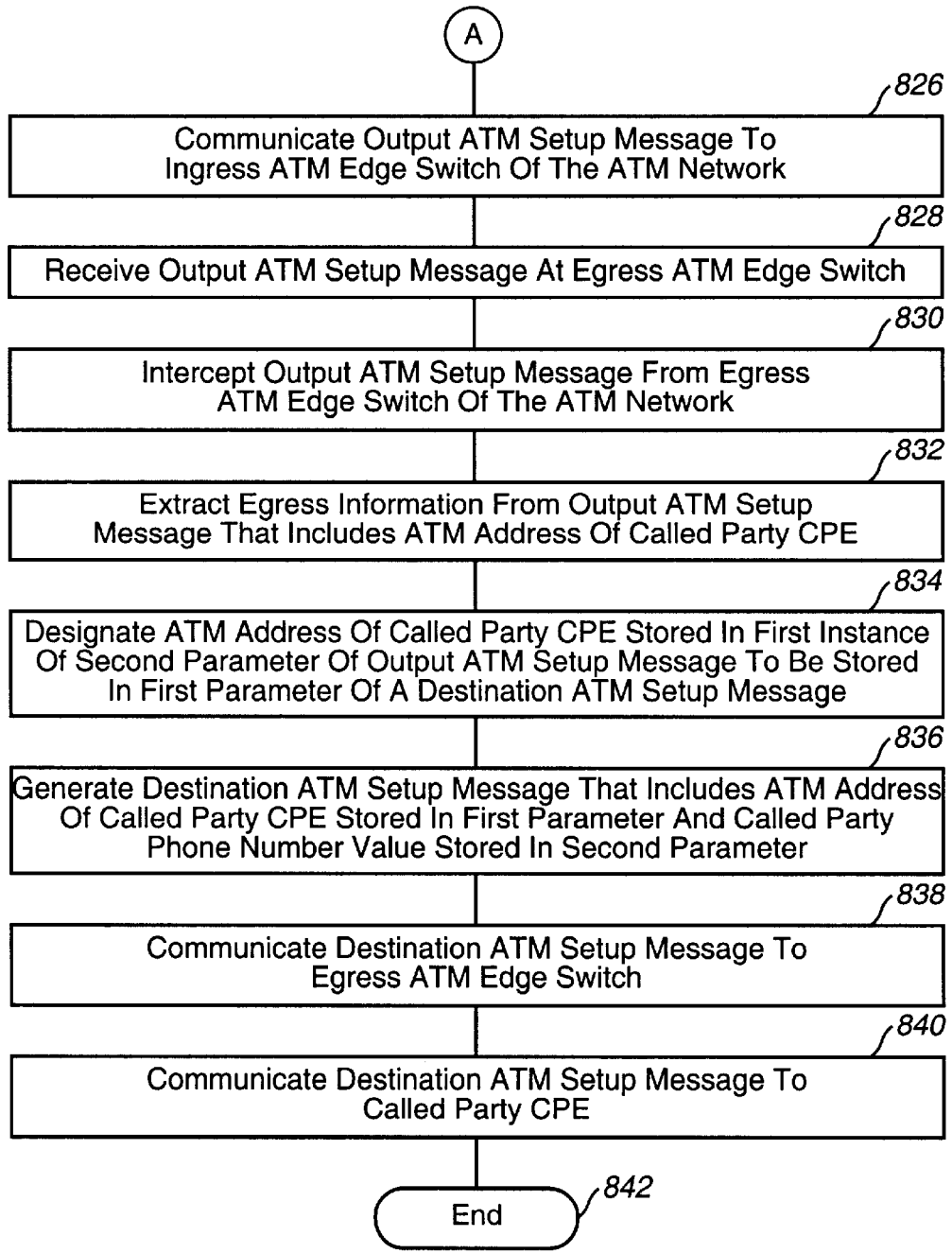

FIGS. 8a and 8b are flowcharts that illustrate a method 800 for providing VToA services and private address translation using an intelligent network and a switched virtual circuit over an ATM network, according to another aspect of the present invention. The method 800 begins at block 802 and proceeds to block 804. At block 804 a request to make a VToA call is received at a calling party CPE, which may also be referred to as an ingress CPE, that includes a called party phone number value. In one embodiment, a telephone or computer configured with telephony software is used to request a VToA call that is received at the CPE, which may be implemented in one embodiment as an enterprise gateway. In such a case, the enterprise gateway would receive the request to make the VToA call from the telephony device.

At block 806, an input ATM setup message is generated at the calling party CPE. Although any of a variety of values may be generated in connection with the input ATM setup message, in a preferred embodiment, a VToA designator is stored in a first parameter, such as the called party number parameter, and a called party phone number is stored in a second parameter, such as the called party subaddress parameter, as the input ATM setup message is generated.

The method 800 proceeds next to block 808 where the input ATM setup message is provided from the CPE and is received at an ingress ATM edge switch. This ingress ATM edge switch may be considered to be part of the ATM network. At block 810, the input ATM setup message is intercepted from the ingress ATM edge switch. This will preferably be achieved using an ASIP.

The method 800 proceeds next to block 812 where information is extracted from the input ATM setup message. This information will include the VToA designator and the called party phone number, which were stored and/or generated with the input ATM setup message at block 806. In a preferred embodiment, the acts described in block 812 will be performed by an ASIP. Once the information has been extracted, the method 800 proceeds next to block 814. At block 814, the information is analyzed to determine if the VToA designator is present. In a preferred embodiment, this will be performed by an MSCP. If the VToA designator is found or is present in the information extracted from the input ATM setup message, this indicates that a request is being made for a VToA call using a SVC of the ATM network.

The method 800 proceeds next to block 816 where the ATM address of the called party CPE is designated to be stored in the first parameter of the output ATM setup message, which is the called party number parameter. The ATM address of the called party CPE may be determined, in a preferred embodiment, using the called party phone number value, which will be included as part of the information extracted from the input ATM setup message, and a database that can be used to correlate the called party phone number value with the appropriate ATM address of the called party CPE. This act will preferably be performed by the MSCP as well. Before proceeding to block 818, it should be noted that any of a variety of known or available intelligent network services and features may be provided at this time. Such services and features are preformed before the application of any private address translation. Generally, it is preferable to perform as much processing for such intelligent network services and features at the ingress side of the connection. The available intelligent network services and features may be determined by any of a variety of means such as by a user profile, a group profile, the attributes of the calling party phone number, the attributes of the called party phone number, or the ATM addresses of the ingress and egress CPEs.

At block 818, it is determined if private address translation is needed. As discussed above, this may be achieve using any of a variety of known and available techniques. For example, a particular customer may be designated to receive private address translation for all of its users because the customer has a private ATM network with an addressing scheme that might conflict with others. Thus, any information related to such a customer may be used to determine that private address translation is needed. In a preferred embodiment, when a customer provides all ATM traffic to the ingress ATM edge switch through designated port of the ingress ATM edge switch, this fact may be used to determine to perform private address translation. It should also be noted that any VToA service and feature processing should be performed before private address translation actually occurs at an ingress point.

Proceeding next to block 820, if private address translation is requested or required, the ATM address of the called party CPE is designated to be stored in the second parameter, such as the called party subaddress, of the output ATM setup message. Similarly, at block 822 the ATM address of the egress ATM edge switch is designated to be stored in the first parameter, which is preferably the called party number parameter, of the output ATM setup message.

At block 824, an output ATM setup message is generated. This output ATM setup message will preferably include: (i) the ATM address of the egress ATM edge switch stored in the first parameter such as the called party number parameter; (ii) the ATM address of the called party CPE stored in a first instance of the second parameter, such as the first instance of the called party subaddress parameter, and (iii) the called party phone number value stored in a second instance of the second parameter, such as the second instance of the called party subaddress parameter. This will preferably be performed by the ASIP associated with the ingress ATM edge switch.

The method 800 proceeds next to block 826 where the output ATM setup message is communicated to the ingress ATM edge switch of the ATM network. At block 828, the output ATM setup message is transmitted through the public or non-private ATM network and is eventually received at an egress ATM edge switch. At block 830, the output ATM setup message will be intercepted by the intelligent network, which will preferably be an ASIP associated with the egress ATM edge switch. The method 800 proceeds next to block 832.

At block 832, which is similar to block 812 discussed above, egress information is extracted from the output ATM setup message that includes the ATM address of the called party CPE. Proceeding next to block 834, the ATM address of the called party CPE is designated to be stored in the first parameter, which preferably will be the called party number parameter, of a destination ATM setup message. This will allow the destination ATM setup message to properly route the setup message through the private ATM network. Thus, private address translation has been provided at the egress MSCP so that the destination ATM setup message will be properly routed. At this point, before proceeding to block 836 where the destination ATM setup message is generated, it should be noted that any of a variety of known or available intelligent network services and features may be provided at the egress MSCP at this time. Such services and features are preformed after the application of any private address translation at the egress MSCP so that such services and features will performed on the correct ATM addresses.

At block 836, the destination ATM setup message is generated that includes the ATM address of the called party CPE stored in the first parameter, such as the called party number parameter, and the called party phone number value stored in a second parameter, such as the called party subaddress parameter. At block 838, the destination ATM setup message is communicated to the egress ATM edge switch where it sent to the called party CPE in block 840. The method 800 ends at block 842.

It should be understood that although private address translation has been illustrated herein primarily with respect to VToA, in no way is private address translation limited in scope to VToA. On the contrary, private address translation may apply to any ATM connection, whether it involves VToA or an ATM data call. This is illustrated below in connection with the description of FIGS. 9a-9b.

Figure 9A:
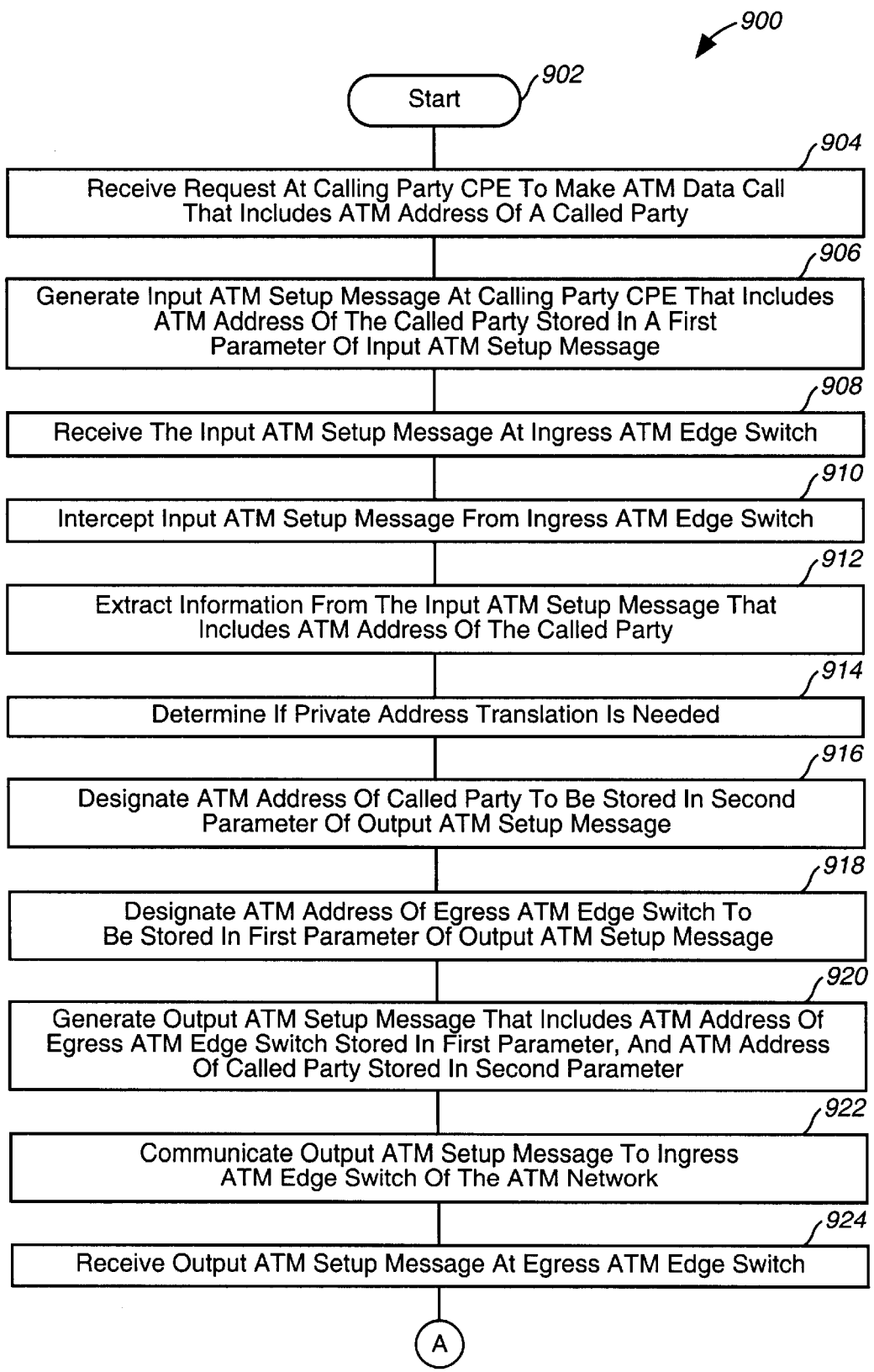
FIGS. 9a and 9b are flowcharts that illustrates a method for establishing an ATM data call with private address translation using an intelligent network and a switched virtual circuit over an ATM network.
Figure 9B:
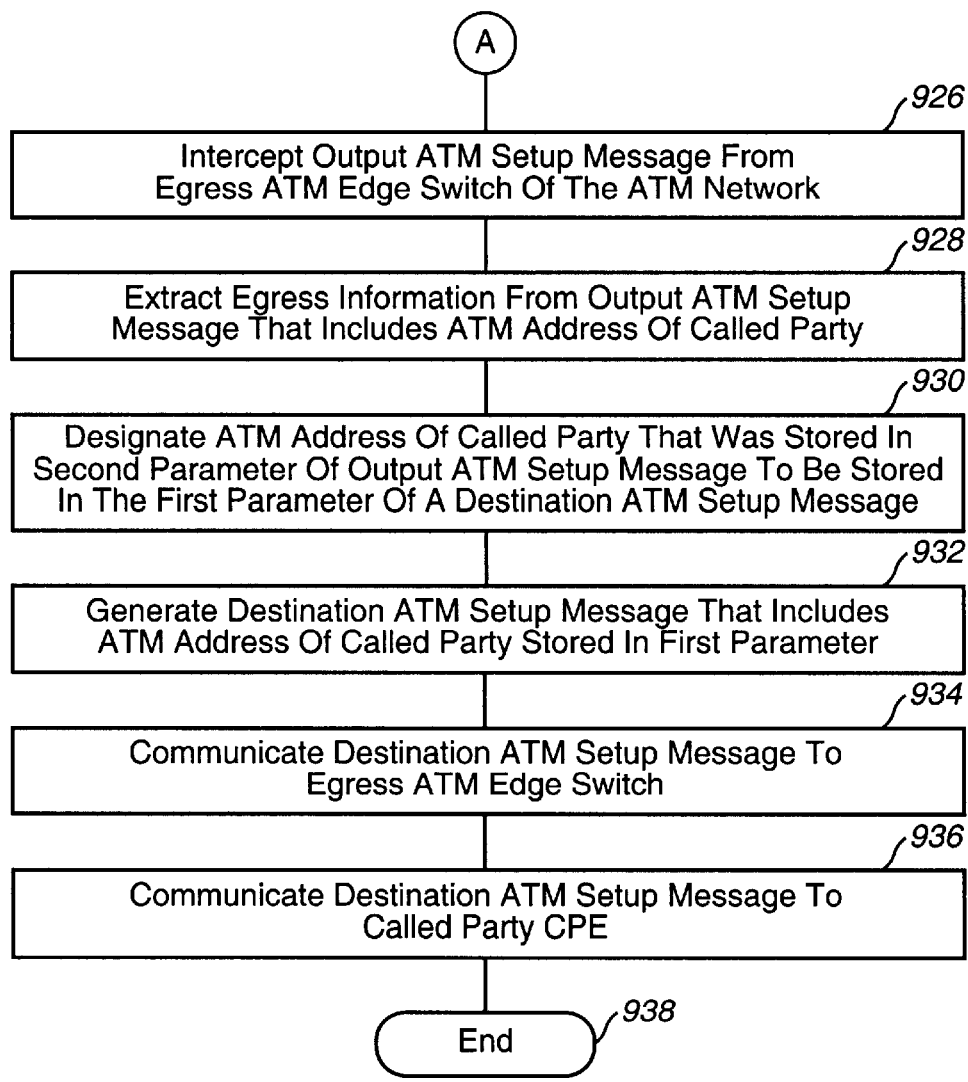

FIGS. 9a and 9b are flowcharts that illustrates a method for establishing an ATM data call with private address translation using an intelligent network and a switched virtual circuit over an ATM network, according to another aspect of the present invention. The method 900 begins at block 902 and proceeds to block 904. At block 904 a request to make an ATM data call is received at a calling party CPE, which may also be referred to as an ingress CPE, that includes an ATM address of a called party. The ingress CPE may be implemented, in one embodiment, as an enterprise gateway.

At block 906, an input ATM setup message is generated at the calling party CPE. Although any of a variety of values may be generated in connection with the input ATM setup message, in a preferred embodiment, a ATM address of a called party is stored in a first parameter, such as the called party number parameter, as the input ATM setup message is generated.

The method 900 proceeds next to block 908 where the input ATM setup message is provided from the CPE and is received at an ingress ATM edge switch. This ingress ATM edge switch may be considered to be part of the ATM network. At block 910, the input ATM setup message is intercepted from the ingress ATM edge switch. This will preferably be achieved using an ASIP.

The method 900 proceeds next to block 912 where information is extracted from the input ATM setup message. This information will include the ATM address of the called party, which was stored and/or generated with the input ATM setup message at block 906. In a preferred embodiment, the acts described in block 912 will be performed by an ASIP. Once the information has been extracted, the method 900 proceeds next to block 914. Before proceeding to block 914, it should be noted that any of a variety of known or available intelligent network services and features may be provided at this time. Such services and features are preformed before the application of any private address translation. Generally, it is preferable to perform as much processing for such intelligent network services and features at the ingress side of the connection. The available intelligent network services and features may be determined by any of a variety of means such as by a user profile, a group profile, or the ATM addresses of the ingress and egress CPEs.

At block 914, it is determined if private address translation is needed. This may be achieve using any of a variety of known and available techniques. For example, a particular customer may be designated to receive private address translation for all of its users because the customer has a private ATM network with an addressing scheme that might conflict with others. Thus, any information related to such a customer may be used to determine that private address translation is needed. In a preferred embodiment, when a customer provides all ATM traffic to the ingress ATM edge switch through designated port of the ingress ATM edge switch, this fact may be used to determine whether to perform private address translation. It should also be noted that any intelligent network service and feature processing should be performed before private address translation actually occurs at an ingress point.

The method 900 proceeds next to block 916 where the ATM address of the called party is designated to be stored in a second parameter of the output ATM setup message, which is preferably the called party subaddress parameter. Similarly, at block 918 the ATM address of the egress ATM edge switch is designated to be stored in a first parameter, which is preferably the called party number parameter, of the output ATM setup message. The ATM address of the egress ATM edge switch may be determined, in a preferred embodiment, using the ATM address of the called party, which will be included as part of the information extracted from the input ATM setup message, and a database that can be used to correlate this information with the ATM address of the egress ATM edge switch. This act will preferably be performed by the MSCP as well.

At block 920, an output ATM setup message is generated. This output ATM setup message will preferably include: (i) the ATM address of the egress ATM edge switch stored in the first parameter, such as the called party number parameter; and (ii) the ATM address of the called party stored the second parameter, such as the called party subaddress parameter. This will preferably be performed by the ASIP associated with the ingress ATM edge switch.

The method 900 proceeds next to block 922 where the output ATM setup message is communicated to the ingress ATM edge switch of the ATM network. At block 924, the output ATM setup message is transmitted through the public or non-private ATM network and is eventually received at an egress ATM edge switch. At block 926, the output ATM setup message will be intercepted by the intelligent network, which will preferably be an ASIP associated with the egress ATM edge switch. The method 900 proceeds next to block 928.

At block 928, which is similar to block 912 discussed above, egress information is extracted from the output ATM setup message that includes the ATM address of the called party. Proceeding next to block 930, the ATM address of the called party is designated to be stored in the first parameter, which preferably will be the called party number parameter, of a destination ATM setup message. This will allow the destination ATM setup message to properly route the setup message through the private ATM network. Thus, private address translation has been provided at the egress MSCP so that the destination ATM setup message will be properly routed. At this point, before proceeding to block 932 where the destination ATM setup message is generated, it should be noted that any of a variety of known or available intelligent network services and features may be provided at the egress MSCP at this time. Such services and features are preformed after the application of any private address translation at the egress MSCP so that such services and features will performed on the correct ATM addresses.

At block 932, the destination ATM setup message is generated that includes the ATM address of the called party stored in the first parameter, such as the called party number parameter. At block 934, the destination ATM setup message is communicated to the egress ATM edge switch where it sent to the called party CPE in block 936. The method 900 ends at block 938.

Although private address translation was illustrated primarily with respect to called party addresses, it should be understood that private address translation can also be applied to calling party addresses. In fact, the present invention recognizes that some ATM switches will reject messages that contain apparently invalid values in the calling party number parameter. For this reason, it is advantageous to also perform private address translation with respect to calling party addresses as well. For example, multiple instances are supported in the calling party subaddress parameter of ATM setup messages, which provide a location to facilitate private address translation of calling party addresses for VToA calls, as well as for ATM data calls.

Thus, it is apparent that there has been provided, in accordance with the present invention, an intelligent network and method for providing VToA and private address translation that provides improved performance and that satisfies one or more of the advantages set forth above. The present invention provides advanced intelligent network services and features, including private address translation, that dramatically increase the attractiveness of using VToA by providing the advanced services and features, with little administrative burden or expense to maintain. Although the preferred embodiment has been described in detail, it should be understood that various changes, substitutions, and alterations can be made herein without departing from the scope of the present invention, even if all of the advantages identified above are not present. For example, although the focus herein is primarily on VToA and private address translation, application to other packet-switched telecommunications technologies, both individually and collectively, may apply also to any of the technologies mentioned above or similar technologies. Also, the techniques, systems, sub-systems, and methods described and illustrated in the preferred embodiment as discrete or separate may be combined or integrated with other systems, modules, techniques, or methods without departing from the scope of the present invention. For example, the ATM signaling intercept processor and the multi-service control point may be implemented separately or together, or may by directly coupled to each other or could be coupled through some other interface and are not considered directly coupled to each other but may still be in communication with one another. Other examples of changes, substitutions, and alterations are readily ascertainable by one skilled in the art and could be made without departing from the spirit and scope of the present invention.

What is claimed is:

1. An intelligent network for use with an ATM network to set up an ATM switched virtual circuit to provide VToA services and private address translation, the intelligent network comprising:

a multi-service control point operable to receive an input extracted from an input ATM setup message that includes a called party phone number value and a VToA designator, analyze the input to determine if the VToA designator is present, designate an ATM address of a called party CPE to be stored in a first instance of a called party subaddress parameter of an output ATM setup message, determine if private address translation is needed, designate an ATM address of an egress ATM edge switch to be stored in a called party number parameter of the output ATM setup message, and generate an output in response for use in generating the output ATM setup message;

an ATM signaling intercept processor operable to intercept the input ATM setup message from an ingress ATM edge switch of the ATM network, extract the input from the input ATM setup message, communicate the input to the multi-service control point, receive the output generated by the multi-service control point, generate the output ATM setup message using the output that includes the ATM address of the egress ATM edge switch stored in the called party number parameter, the ATM address of the called party CPE stored in the first instance of the called party subaddress parameter, and the called party phone number value stored in a second instance of the called party subaddress, and communicate the output ATM setup message to the ingress ATM edge switch of the ATM network;

a second multi-service control point operable to receive an egress input extracted from the output ATM setup message that includes the called party phone number value and the ATM address of the called party CPE, designate the ATM address of the called party CPE that was stored in the first instance of the called party subaddress parameter of the output ATM setup switch to be stored in the called party number parameter of a destination ATM setup message, and generate an egress output in response;

a second ATM signaling intercept processor operable to intercept the output ATM setup message from an egress ATM edge switch of the ATM network, extract the egress input from the output ATM setup message, communicate the egress input to the second multi-service control point, receive the egress output generated by the multi-service control point, generate the destination ATM setup message using the egress output that includes the ATM address of the called party CPE stored in the called party parameter, and the called party phone number value stored in the called party subaddress parameter and communicate the destination ATM setup message to the egress ATM edge switch of the ATM network; and a service administration operable to provision the multi-service control point, the ATM signaling intercept processor, the second multi-service control point and the second ATM signaling intercept processor.

2. The intelligent network of claim 1, wherein the second multi-service control point and the multi-service control point are implemented as one multi-service control point.

3. The intelligent network of claim 2, wherein the multi-service control point includes various applications operable to provide VToA services through the analyzed input to generate the output.

4. The intelligent network of claim 3, wherein the multi-service control point is operable to process the input to provide desired services before designating the ATM address of an egress ATM edge switch to be stored in the called party number parameter of the output ATM setup message.

5. The intelligent network of claim 4, wherein the second multi-service control point is operable to process the egress input to provide desired services after designating the ATM address of the called party CPE that was stored in the first instance of the called party subaddress parameter of the output ATM setup switch to be stored in the called party number parameter of the destination ATM setup message.

6. The intelligent network of claim 1, wherein the multi-service control point determines if private address translation is needed by identifying a port of the ingress ATM edge switch that received the input ATM setup message.

7. A method for providing VToA and private address translation using an intelligent network and a switched virtual circuit over an ATM network, the method comprising:

receiving a request at a calling party CPE to make a VToA call that includes a called party phone number value;

generating an input ATM setup message at the calling party CPE that includes a VToA designator stored in a first parameter of the input ATM setup message, and the called party phone number value stored in a second parameter of the input ATM setup message;

receiving the input ATM setup message at a device side of an ingress ATM edge switch of the ATM network;

intercepting the input ATM setup message from the device side of the ingress ATM edge switch of the ATM network;

extracting information from the input ATM setup message that includes the VToA designator and the called party phone number value;

analyzing the information to determine if the VToA designator is present;

designating an ATM address of a called party CPE to be stored in the first parameter of an output ATM setup message;

determining if private address translation is needed;

designating the ATM address of the called party CPE to be stored in a first instance of the second parameter of the output ATM setup message;

designating an ATM address of an egress ATM edge switch to be stored in the first parameter of the output ATM setup message;

generating an output ATM setup message that includes the ATM address of the egress ATM edge switch stored in the first parameter, the ATM address of the called party CPE stored in the first instance of the second parameter, and the called party phone number value stored in a second instance of the second parameter;

communicating the output ATM setup message to a network side of the ingress ATM edge switch of the ATM network;

receiving the output ATM setup message at a network side of the egress ATM edge switch;

intercepting the output ATM setup message from the network side of the egress ATM edge switch of the ATM network;

extracting egress information from the output ATM setup message that includes the ATM address of the called party CPE;

designating the ATM address of the called party CPE that was stored in the first instance of the second parameter of the output ATM setup message to be stored in the first parameter of a destination ATM setup message;

generating a destination ATM setup message that includes the ATM address of the called party CPE stored in the first parameter and the called party phone number value stored in the second parameter;

communicating the destination ATM setup message to a device side of the egress ATM edge switch; and communicating the destination ATM setup message to the called party CPE.

8. The method of claim 7, wherein the first parameter of the output ATM setup message is the called party number parameter and the second parameter of the output ATM setup message is the called party subaddress parameter.

9. The method of claim 8, wherein the first parameter of the destination ATM setup message is the called party number.

10. The method of claim 7, further comprising: processing the information to provide desired services before designating the ATM address of the called party CPE to be stored in a second parameter of the output ATM setup message.

11. The method of claim 10, further comprising:
processing the information to provide desired services before designating the ATM address of the called party CPE that was stored in the first instance of the second parameter of the output ATM setup message to be stored in the first parameter of a destination ATM setup message.

12. The method of claim 7, wherein the ATM address of the called party CPE is determined using the called party phone number value and a database.

13. The method of claim 7, wherein private address translation is performed on ATM addresses of the calling party.

14. The method of claim 7, wherein intercepting the input ATM setup message at the device side of the ingress ATM edge switch includes determining a port of the ingress ATM edge switch that received the input ATM setup message, and wherein the port is used in determining if private address translation is needed.

15. The method of claim 7, wherein generating an input ATM setup message at the calling party CPE includes storing the VToA designator in the called party address parameter and storing the called party phone number value in the called party subaddress parameter.

16. A method for providing an ATM data call with private address translation using an intelligent network and a switched virtual circuit over an ATM network, the method comprising:
receiving a request at a calling party CPE to make an ATM data call that includes an ATM address of a called party;
generating an input ATM setup message at the calling party CPE that includes the ATM address of the called party stored in a first parameter of the input ATM setup message;
receiving the input ATM setup message at a device side of an ingress ATM edge switch of the ATM network;
intercepting the input ATM setup message from the device side of the ingress ATM edge switch of the ATM network;
extracting information from the input ATM setup message that includes the ATM address of the called party;
determining if private address translation is needed;
designating the ATM address of the called party to be stored in a second parameter of the output ATM setup message;
designating an ATM address of an egress ATM edge switch to be stored in the first parameter of the output ATM setup message;
generating an output ATM setup message that includes the ATM address of the egress ATM edge switch stored in the first parameter, and the ATM address of the called party stored in the second parameter;
communicating the output ATM setup message to a network side of the ingress ATM edge switch of the ATM network;
receiving the output ATM setup message at a network side of the egress ATM edge switch;
intercepting the output ATM setup message from the network side of the egress ATM edge switch of the ATM network;
extracting egress information from the output ATM setup message that includes the ATM address of the called party;
designating the ATM address of the called party that was stored in the second parameter of the output ATM setup message to be stored in the first parameter of a destination ATM setup message;
generating a destination ATM setup message that includes the ATM address of the called party stored in the first parameter;
communicating the destination ATM setup message to a device side of the egress ATM edge switch; and
communicating the destination ATM setup message to the called party CPE.

17. The method of claim 16, wherein the first parameter of the output ATM setup message is the called party number parameter and the second parameter of the output ATM setup message is the called party subaddress parameter.

18. The method of claim 17, wherein the first parameter of the destination ATM setup message is the called party number.

19. The method of claim 16, further comprising: processing the information to provide desired services before designating the ATM address of the called party to be stored in a second parameter of the output ATM setup message.

20. The method of claim 16, wherein private address translation is performed on ATM addresses of the calling party.

21. The method of claim 16, wherein intercepting the input ATM setup message at the device side of the ingress ATM edge switch includes determining a port of the ingress ATM edge switch that received the input ATM setup message, and wherein the port is used in determining if private address translation is needed.

22. The method of claim 16, wherein generating an input ATM setup message at the calling party CPE includes storing the ATM address of the called party value in the called party number parameter.

* * * * *